United States Patent
Takahashi et al.

(10) Patent No.: US 8,151,842 B2
(45) Date of Patent: Apr. 10, 2012

(54) PNEUMATIC TIRE

(75) Inventors: Fumio Takahashi, Kodaira (JP); Seiji Ishikawa, Kodaira (JP)

(73) Assignee: Bridgestone Corporation, Tokyo (JP)

(*) Notice: Subject to any disclaimer, the term of this patent is extended or adjusted under 35 U.S.C. 154(b) by 681 days.

(21) Appl. No.: 12/295,411

(22) PCT Filed: Apr. 2, 2007

(86) PCT No.: PCT/JP2007/057415
§ 371 (c)(1),
(2), (4) Date: Dec. 31, 2008

(87) PCT Pub. No.: WO2007/114430
PCT Pub. Date: Oct. 11, 2007

(65) Prior Publication Data
US 2009/0165908 A1    Jul. 2, 2009

(30) Foreign Application Priority Data

Mar. 31, 2006 (JP) ................ 2006-096510
Mar. 31, 2006 (JP) ................ 2006-097866
Mar. 31, 2006 (JP) ................ 2006-098306
Mar. 31, 2006 (JP) ................ 2006-099339

(51) Int. Cl.
*B60C 11/117* (2006.01)
*B60C 11/12* (2006.01)
(52) U.S. Cl. ............ 152/209.3; 152/209.17; 152/209.18
(58) Field of Classification Search ............ 152/154.2, 152/209.1, 209.3, 209.8, 209.9, 209.18, 901, 152/209.17
See application file for complete search history.

(56) References Cited

U.S. PATENT DOCUMENTS
4,178,199 A * 12/1979 Lippman et al. ........... 29/894.37

FOREIGN PATENT DOCUMENTS
| DE | 199 01 820 A1 | 4/2000 |
| EP | 0 989 000 A2 | 3/2000 |
| JP | 61-169302 A | 7/1986 |
| JP | 05-338411 A | 12/1993 |

(Continued)

OTHER PUBLICATIONS

JP 5-338411, Dec. 21, 1993, JPO English language machine translation.*

(Continued)

Primary Examiner — Eric Hug
(74) Attorney, Agent, or Firm — Sughrue Mion, PLLC

(57) ABSTRACT

A pneumatic tire is provided which has sufficient total properties and mass productivity of a tire without reducing drainage capability due to narrowed circumferential grooves, achieves high design flexibility of tread patterns and stiffness of land portion as intended, and also effectively reduces undesired air column resonance noise produced by the circumferential grooves. The pneumatic tire includes a circumferential groove 3 which continuously and circumferentially extends in a straight line and arranged on a tread 1, and resonators 5 which are open to the circumferential groove 3 and terminate in a land portion 4, each of the resonators 5 being configured with an air chamber 6 open toward a land portion surface, and a narrowed neck 7 for communication between the air chamber 6 and the circumferential groove 3, and the narrowed neck 7 has the plane maximum width $w_0$ which is within a range of from 3 to 50% of the plane maximum width $w_1$ of the air chamber 6.

16 Claims, 32 Drawing Sheets

FOREIGN PATENT DOCUMENTS

| | | |
|---|---|---|
| JP | 7-76203 A | 3/1995 |
| JP | 2000-118207 A | 4/2000 |
| JP | 2001-191734 A | 7/2001 |
| JP | 2003-63212 A | 3/2003 |
| JP | 2003-97371 A | 4/2003 |
| JP | 2003097371 A | 4/2003 |
| WO | 2004/103737 A1 | 2/2004 |

OTHER PUBLICATIONS

JP 7-76203, Mar. 20, 1995, JPO English language machine translation.*

EP 0989000, Mar. 29, 2000, Derwent Abstract.*

EP 0989000, Mar. 29, 2000, EPO English language machine translation.*

Chinese Office Action dated Feb. 12, 2010 (with English translation) (17 pages).

Supplementary European Search Report dated Dec. 3, 2009 (6 pages).

European Office Action issued in Application No. 07740851.6 dated Oct. 21, 2011.

* cited by examiner

FIG. 7
(a) 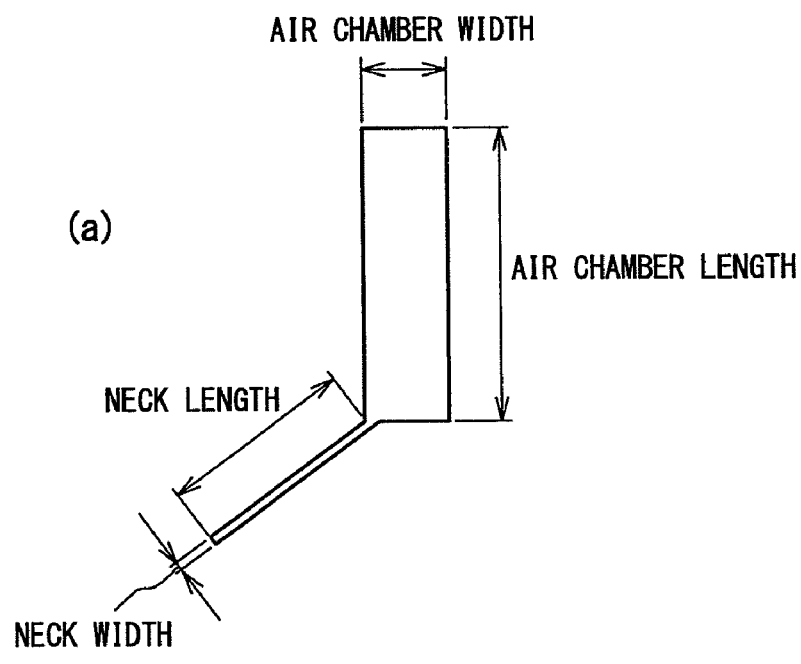
(b) 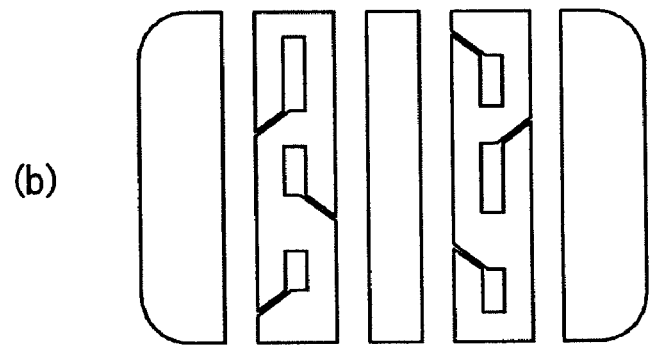
(c) 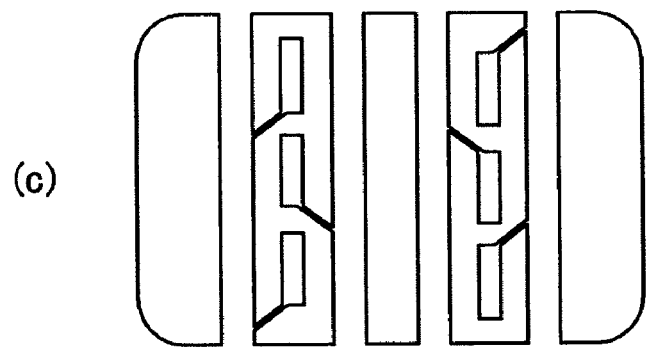

| RANGE OF RESONANCE FREQUENCIES | (INDIVIDUAL) RESONANCE FREQUENCY [Hz] | EFFECT [dB] | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|---|---|
| 500-600Hz | 492 | 1.8 | 7 | 14 | 6 | 10 | 1 | 0.5 | 492 |
|  | 557 |  | 6.5 | 13 | 6 | 9 | 1 | 0.5 | 557 |
|  | 603 |  | 6 | 12 | 6 | 9 | 1 | 0.5 | 603 |
| 700-800Hz | 683 | 2.5 | 6 | 12 | 7 | 12 | 2 | 0.5 | 683 |
|  | 772 |  | 6.5 | 12 | 6 | 10 | 2 | 0.5 | 772 |
|  | 802 |  | 7 | 12 | 6 | 8.5 | 2 | 0.5 | 802 |
| 1000-1100Hz | 984 | 2.7 | 8 | 12 | 6.5 | 7 | 2 | 0.8 | 984 |
|  | 1062 |  | 8 | 11 | 6.5 | 6.5 | 2 | 0.8 | 1062 |
|  | 1113 |  | 8 | 10 | 6.5 | 6.5 | 2 | 0.8 | 1113 |
| 1300-1400Hz | 1295 | 2.6 | 6.5 | 12 | 6.5 | 6 | 2 | 1 | 1295 |
|  | 1348 |  | 6.5 | 12 | 6 | 6 | 2 | 1 | 1348 |
|  | 1408 |  | 6.5 | 12 | 5.5 | 6 | 2 | 1 | 1408 |
| 1700-1800Hz | 1697 | 2.1 | 6.5 | 11 | 6 | 5 | 2 | 1.5 | 1697 |
|  | 1760 |  | 7 | 12 | 5.5 | 4 | 2 | 1.5 | 1760 |
|  | 1801 |  | 7.5 | 14 | 5 | 5 | 2 | 1.5 | 1801 |
| 1900-2000Hz | 1916 | 1.2 | 6.5 | 12 | 5 | 5 | 2 | 1.5 | 1916 |
|  | 1957 |  | 6.5 | 11.5 | 5 | 5 | 2 | 1.5 | 1957 |
|  | 2001 |  | 6.5 | 11 | 5 | 5 | 2 | 1.5 | 2001 |

| RANGE OF RESONANCE FREQUENCIES | (INDIVIDUAL) RESONANCE FREQUENCY [Hz] | EFFECT [dB] | AIR CHAMBER WIDTH [mm] | AIR CHAMBER LENGTH [mm] | AIR CHAMBER DEPTH [mm] | NECK WIDTH [mm] | NECK LENGTH [mm] | NECK DEPTH [mm] | NECK WIDTH [mm] | OPERATION FREQUENCY [Hz] |
|---|---|---|---|---|---|---|---|---|---|---|
| 0 | 1014 | 0 | 6 | 12 | 6 | 6 | 2 | 0.5 | 1014 |
|  | 1014 |  | 6 | 12 | 6 | 6 | 2 | 0.5 | 1014 |
| 85 | 1014 | 0.6 | 6 | 12 | 6 | 6 | 2 | 0.5 | 1014 |
|  | 974 |  | 6 | 13 | 6 | 6 | 2 | 0.5 | 974 |
|  | 1014 |  | 6 | 12 | 6 | 6 | 2 | 0.5 | 1014 |
|  | 1059 |  | 6 | 11 | 6 | 6 | 2 | 0.5 | 1059 |
| 209 | 891 | 1.1 | 6 | 12 | 6 | 8 | 2 | 0.5 | 891 |
|  | 1014 |  | 6 | 12 | 6 | 6 | 2 | 0.5 | 1014 |
|  | 1099 |  | 6 | 12 | 6 | 5 | 2 | 0.5 | 1099 |
| 288 | 939 | 1.3 | 6 | 14 | 6 | 6 | 2 | 0.5 | 939 |
|  | 1014 |  | 6 | 12 | 6 | 6 | 2 | 0.5 | 1014 |
|  | 1227 |  | 7 | 12 | 6 | 6 | 3 | 0.5 | 1227 |
|  | 763 |  | 6 | 14 | 6 | 8 | 2 | 0.5 | 763 |
| 454 | 1014 | 1.4 | 6 | 12 | 6 | 6 | 2 | 0.5 | 1014 |
|  | 1217 |  | 5 | 10 | 6 | 6 | 2 | 0.5 | 1217 |
|  | 689 |  | 7 | 14 | 6 | 10 | 2 | 0.5 | 689 |
| 630 | 1014 | 1.3 | 6 | 12 | 6 | 6 | 2 | 0.5 | 1014 |
|  | 1319 |  | 5 | 10 | 6 | 5 | 2 | 0.5 | 1319 |
|  | 632 |  | 7 | 14 | 6 | 12 | 2 | 0.5 | 632 |
| 822 | 1014 | 1.05 | 6 | 12 | 6 | 6 | 2 | 0.5 | 1014 |
|  | 1454 |  | 6 | 10 | 6 | 5 | 3 | 0.5 | 1454 |
|  | 550 |  | 7 | 14 | 6 | 12 | 1.5 | 0.5 | 550 |
| 1011 | 1014 | 0.7 | 6 | 12 | 6 | 6 | 2 | 0.5 | 1014 |
|  | 1561 |  | 6 | 10 | 6 | 5 | 3.5 | 0.5 | 1561 |

FIG. 10

15 CIRCUMFERENTIAL PITCHES (PITCH LENGTH : 133.4mm)

| ONE IN GROUND CONTACT SURFACE (COMPARATIVE TIRE) | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|
| | 5 | 36 | 6 | 10 | 4.5 | 1 | 1039 |
| | 5 | 36 | 5 | 12 | 3 | 2.2 | 1257 |

30 CIRCUMFERENTIAL PITCHES (PITCH LENGTH : 66.7mm)

| TWO IN GROUND CONTACT SURFACE | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|
| | 5 | 18 | 6 | 10 | 4.5 | 0.5 | 1060 |
| | 5 | 18 | 5 | 12 | 3 | 1 | 1226 |

45 CIRCUMFERENTIAL PITCHES (PITCH LENGTH : 44.5mm)

| THREE IN GROUND CONTACT SURFACE | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|
| | 5 | 12 | 6 | 10 | 3 | 0.5 | 1070 |
| | 5 | 12 | 5 | 12 | 4 | 0.5 | 1237 |

60 CIRCUMFERENTIAL PITCHES (PITCH LENGTH : 33.4mm)

| FOUR IN GROUND CONTACT SURFACE | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|
| | 5 | 9 | 6 | 10 | 2.2 | 0.5 | 1064 |
| | 5 | 9 | 5 | 12 | 2 | 0.75 | 1244 |

90 CIRCUMFERENTIAL PITCHES (PITCH LENGTH : 22.2mm)

| SIX IN GROUND CONTACT SURFACE | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|
| | 5 | 6 | 6 | 10 | 1.5 | 0.5 | 1083 |
| | 5 | 6 | 5 | 12 | 2 | 0.5 | 1252 |

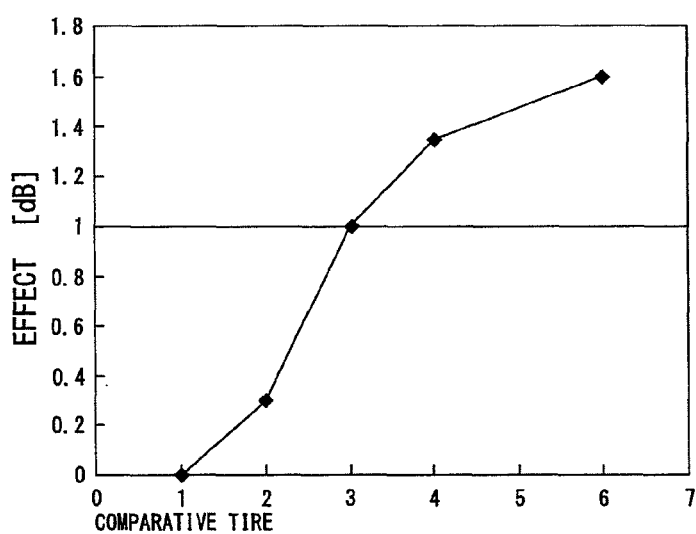

THE NUMBER OF RESONATORS IN GROUND CONTACT SURFACE

FIG. 13
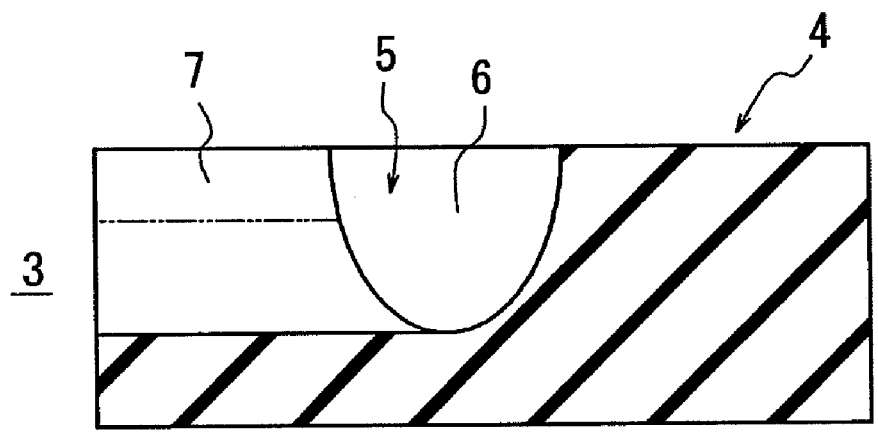
(a)
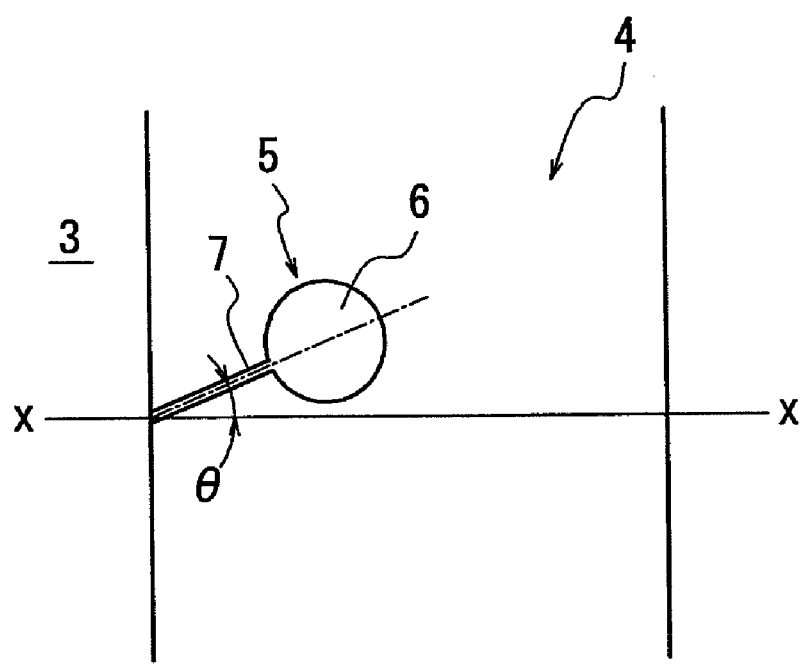
(b)

| AIR CHAMBER OPENING AREA [mm²] | EFFECT [dB] | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|---|
| 10 | 0.9 | 3.3 | 3 | 6 | 17.5 | 1 | 0.5 | 1187 |
| | | 3.3 | 3 | 6 | 25 | 1 | 0.5 | 994 |
| | | 3.3 | 3 | 6 | 32.5 | 1 | 0.5 | 871 |
| 20 | 1.5 | 3.3 | 6 | 6 | 8.4 | 1 | 0.5 | 1199 |
| | | 3.3 | 6 | 6 | 12 | 1 | 0.5 | 1003 |
| | | 3.3 | 6 | 6 | 15.6 | 1 | 0.5 | 880 |
| 25 | 2.2 | 5 | 5 | 7.2 | 10.5 | 2 | 0.5 | 1229 |
| | | 5 | 5 | 7.2 | 15 | 2 | 0.5 | 1028 |
| | | 5 | 5 | 7.2 | 19.5 | 2 | 0.5 | 902 |
| 50 | 3.1 | 5 | 10 | 6 | 6.3 | 2 | 0.5 | 1210 |
| | | 5 | 10 | 6 | 9 | 2 | 0.5 | 1012 |
| | | 5 | 10 | 6 | 11.7 | 2 | 0.5 | 888 |
| 72 | 3.1 | 8 | 9 | 6 | 4.2 | 2 | 0.5 | 1212 |
| | | 8 | 9 | 6 | 6 | 2 | 0.5 | 1014 |
| | | 8 | 9 | 6 | 7.8 | 2 | 0.5 | 890 |
| 100 | 3.15 | 10 | 10 | 6 | 6.3 | 2 | 1 | 1192 |
| | | 10 | 10 | 6 | 9 | 2 | 1 | 997 |
| | | 10 | 10 | 6 | 11.7 | 2 | 1 | 874 |
| 150 | 3.2 | 10 | 15 | 6 | 6.3 | 2.6 | 1.2 | 1200 |
| | | 10 | 15 | 6 | 9 | 2.6 | 1.2 | 1004 |
| | | 10 | 15 | 6 | 11.7 | 2.6 | 1.2 | 880 |
| 180 | 3 | 10 | 18 | 6 | 4.9 | 3 | 1 | 1198 |
| | | 10 | 18 | 6 | 7 | 3 | 1 | 1003 |
| | | 10 | 18 | 6 | 9.1 | 3 | 1 | 879 |
| 250 | 2.5 | 10 | 25 | 6 | 4.2 | 2.5 | 1.5 | 1200 |
| | | 10 | 25 | 6 | 6 | 2.5 | 1.5 | 1004 |
| | | 10 | 25 | 6 | 7.8 | 2.5 | 1.5 | 881 |
| 300 | 2 | 10 | 30 | 6 | 4.2 | 3 | 1.5 | 1189 |
| | | 10 | 30 | 6 | 6 | 3 | 1.5 | 995 |
| | | 10 | 30 | 6 | 7.8 | 3 | 1.5 | 873 |
| 350 | 1.6 | 10 | 35 | 6 | 4.2 | 3 | 1.8 | 1194 |
| | | 10 | 35 | 6 | 6 | 3 | 1.8 | 999 |
| | | 10 | 35 | 6 | 7.8 | 3 | 1.8 | 877 |

| AVERAGE OF OPERATION FREQUENCIES OF RESONATORS [Hz] | EFFECT [dB] | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|---|
| 626 | 1.6 | 6 | 4.2 | 6 | 18 | 1 | 0.5 | 731 |
|  |  | 6 | 6 | 6 | 18 | 1 | 0.5 | 612 |
|  |  | 6 | 7.8 | 6 | 18 | 1 | 0.5 | 536 |
| 711 | 2.5 | 6.5 | 4.2 | 7 | 22 | 2 | 0.5 | 830 |
|  |  | 6.5 | 6 | 7 | 22 | 2 | 0.5 | 694 |
|  |  | 6.5 | 7.8 | 7 | 22 | 2 | 0.5 | 609 |
| 838 | 2.6 | 7 | 4.2 | 6 | 17 | 2 | 0.5 | 978 |
|  |  | 7 | 6 | 6 | 17 | 2 | 0.5 | 818 |
|  |  | 7 | 7.8 | 6 | 17 | 2 | 0.5 | 718 |
| 903 | 2.8 | 8 | 4.2 | 6.5 | 14 | 2 | 0.6 | 1054 |
|  |  | 8 | 6 | 6.5 | 14 | 2 | 0.6 | 882 |
|  |  | 8 | 7.8 | 6.5 | 14 | 2 | 0.6 | 773 |
| 1038 | 3.2 | 8 | 4.2 | 6.5 | 14 | 2 | 0.8 | 1212 |
|  |  | 8 | 6 | 6.5 | 14 | 2 | 0.8 | 1014 |
|  |  | 8 | 7.8 | 6.5 | 14 | 2 | 0.8 | 889 |
| 1280 | 3.1 | 7 | 4.2 | 6.5 | 13 | 2 | 1 | 1494 |
|  |  | 7 | 6 | 6.5 | 13 | 2 | 1 | 1250 |
|  |  | 7 | 7.8 | 6.5 | 13 | 2 | 1 | 1096 |
| 1378 | 2.8 | 6.5 | 4.2 | 6.5 | 12 | 2 | 1 | 1608 |
|  |  | 6.5 | 6 | 6.5 | 12 | 2 | 1 | 1346 |
|  |  | 6.5 | 7.8 | 6.5 | 12 | 2 | 1 | 1180 |
| 1434 | 2.5 | 6.5 | 4.2 | 6 | 12 | 2 | 1 | 1674 |
|  |  | 6.5 | 6 | 6 | 12 | 2 | 1 | 1401 |
|  |  | 6.5 | 7.8 | 6 | 12 | 2 | 1 | 1228 |
| 1595 | 2.3 | 7 | 4.2 | 6.5 | 8 | 2 | 1 | 1862 |
|  |  | 7 | 6 | 6.5 | 8 | 2 | 1 | 1557 |
|  |  | 7 | 7.8 | 6.5 | 8 | 2 | 1 | 1366 |
| 1670 | 2.1 | 8 | 4.9 | 6.5 | 8 | 2 | 1.5 | 1950 |
|  |  | 8 | 7 | 6.5 | 8 | 2 | 1.5 | 1631 |
|  |  | 8 | 9.1 | 6.5 | 8 | 2 | 1.5 | 1431 |
| 1863 | 2 | 7.5 | 4.55 | 6 | 8 | 2 | 1.5 | 2175 |
|  |  | 7.5 | 6.5 | 6 | 8 | 2 | 1.5 | 1820 |
|  |  | 7.5 | 8.45 | 6 | 8 | 2 | 1.5 | 1596 |
| 2129 | 1.6 | 7.5 | 4.55 | 6 | 8 | 2 | 2 | 2485 |
|  |  | 7.5 | 6.5 | 6 | 8 | 2 | 2 | 2079 |
|  |  | 7.5 | 8.45 | 6 | 8 | 2 | 2 | 1823 |

| MAXIMUM DEPTH OF AIR CHAMBER / MAXIMUM DEPTH OF CIRCUMFERENTIAL GROOVE [%] | EFFECT [dB] | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|---|
| 15 | 1.6 | 6.5 | 19.95 | 1.2 | 25 | 2 | 1 | 1215 |
|    |     | 6.5 | 28.5  | 1.2 | 25 | 2 | 1 | 1017 |
|    |     | 6.5 | 37.05 | 1.2 | 25 | 2 | 1 | 892  |
| 19 | 2.2 | 6.5 | 17.5  | 1.5 | 23 | 2 | 1 | 1208 |
|    |     | 6.5 | 25    | 1.5 | 23 | 2 | 1 | 1011 |
|    |     | 6.5 | 32.5  | 1.5 | 23 | 2 | 1 | 886  |
| 56 | 3.1 | 7   | 8.75  | 4.5 | 14 | 2 | 1 | 1202 |
|    |     | 7   | 12.5  | 4.5 | 14 | 2 | 1 | 1005 |
|    |     | 7   | 16.25 | 4.5 | 14 | 2 | 1 | 882  |
| 90 | 2.5 | 6   | 5.25  | 7.2 | 17 | 2 | 1 | 1210 |
|    |     | 6   | 7.5   | 7.2 | 17 | 2 | 1 | 1012 |
|    |     | 6   | 9.75  | 7.2 | 17 | 2 | 1 | 888  |
| 100 | 2.1 | 6  | 4.9   | 8   | 17 | 2 | 1 | 1188 |
|    |     | 6   | 7     | 8   | 17 | 2 | 1 | 994  |
|    |     | 6   | 9.1   | 8   | 17 | 2 | 1 | 872  |

| LEVEL DIFFERENCE BETWEEN CONCAVITY AND CONVEXITY [mm] | PRESENCE/ABSENCE OF STONE TRAPPING | EFFECT [dB] |
|---|---|---|
| 0.0 | PRESENCE | 3.3 |
| 1.6 | ABSENCE | 3.1 |
| 3.0 | ABSENCE | 3 |
| 4.0 | ABSENCE | 3 |

| NECK DEPTH / MAXIMUM DEPTH OF AIR CHAMBER [%] | EFFECT [dB] | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|---|
| 14 | 2.6 | 6 | 5.25 | 7.2 | 17 | 1 | 2 | 1210 |
|  |  | 6 | 7.5 | 7.2 | 17 | 1 | 2 | 1012 |
|  |  | 6 | 9.75 | 7.2 | 17 | 1 | 2 | 888 |
| 25 | 3.2 | 5 | 4.2 | 6 | 12 | 1.5 | 0.5 | 1187 |
|  |  | 5 | 6 | 6 | 12 | 1.5 | 0.5 | 993 |
|  |  | 5 | 7.8 | 6 | 12 | 1.5 | 0.5 | 871 |
| 50 | 3 | 6.5 | 7.7 | 4 | 20 | 2 | 1 | 1192 |
|  |  | 6.5 | 11 | 4 | 20 | 2 | 1 | 997 |
|  |  | 6.5 | 14.3 | 4 | 20 | 2 | 1 | 875 |
| 70 | 2.1 | 6 | 7.7 | 4 | 15 | 2.8 | 0.5 | 1195 |
|  |  | 6 | 11 | 4 | 15 | 2.8 | 0.5 | 1000 |
|  |  | 6 | 14.3 | 4 | 15 | 2.8 | 0.5 | 877 |
| 80 | 1.7 | 8 | 4.2 | 5 | 14 | 4 | 0.3 | 1202 |
|  |  | 8 | 6 | 5 | 14 | 4 | 0.3 | 1005 |
|  |  | 8 | 7.8 | 5 | 14 | 4 | 0.3 | 882 |

| PLANE MAXIMUM WIDTH OF NECK / PLANE MAXIMUM DEPTH OF AIR CHAMBER [%] | EFFECT [dB] | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|---|
| 3 | 3.1 | 10 | 4.2 | 7 | 9.5 | 5 | 0.5 | 1212 |
| | | 10 | 6 | 7 | 9.5 | 5 | 0.5 | 1014 |
| | | 10 | 7.8 | 7 | 9.5 | 5 | 0.5 | 889 |
| 10 | 3.2 | 5 | 8.4 | 6 | 6 | 1.5 | 0.5 | 1158 |
| | | 5 | 12 | 6 | 6 | 1.5 | 0.5 | 969 |
| | | 5 | 15.6 | 6 | 6 | 1.5 | 0.5 | 850 |
| 20 | 3 | 5 | 14 | 6 | 9 | 2 | 1 | 1192 |
| | | 5 | 20 | 6 | 9 | 2 | 1 | 997 |
| | | 5 | 26 | 6 | 9 | 2 | 1 | 874 |
| 50 | 2.6 | 4 | 14 | 15 | 30 | 1.5 | 2 | 1187 |
| | | 4 | 20 | 15 | 30 | 1.5 | 2 | 993 |
| | | 4 | 26 | 15 | 30 | 1.5 | 2 | 871 |
| 60 | 1.8 | 5 | 17.5 | 6.8 | 14 | 1.5 | 3 | 1206 |
| | | 5 | 25 | 6.8 | 14 | 1.5 | 3 | 1009 |
| | | 5 | 32.5 | 6.8 | 14 | 1.5 | 3 | 885 |

| AVERAGE OF OPERATION FREQUENCIES OF RESONATORS [Hz] | EFFECT [dB] | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|---|
| 618 | 1.8 | 6 | 8.4 | 6 | 9 | 1 | 0.5 | 721 |
|  |  | 6 | 12 | 6 | 9 | 1 | 0.5 | 603 |
|  |  | 6 | 15.6 | 6 | 9 | 1 | 0.5 | 529 |
| 700 | 2.5 | 6.5 | 8.4 | 7 | 11 | 2 | 0.5 | 817 |
|  |  | 6.5 | 12 | 7 | 11 | 2 | 0.5 | 683 |
|  |  | 6.5 | 15.6 | 7 | 11 | 2 | 0.5 | 599 |
| 821 | 2.6 | 7 | 8.4 | 6 | 8.5 | 2 | 0.5 | 958 |
|  |  | 7 | 12 | 6 | 8.5 | 2 | 0.5 | 802 |
|  |  | 7 | 15.6 | 6 | 8.5 | 2 | 0.5 | 703 |
| 879 | 2.8 | 8 | 8.4 | 6.5 | 7 | 2 | 0.6 | 1026 |
|  |  | 8 | 12 | 6.5 | 7 | 2 | 0.6 | 859 |
|  |  | 8 | 15.6 | 6.5 | 7 | 2 | 0.6 | 753 |
| 1008 | 3.2 | 8 | 8.4 | 6.5 | 7 | 2 | 0.8 | 1176 |
|  |  | 8 | 12 | 6.5 | 7 | 2 | 0.8 | 984 |
|  |  | 8 | 15.6 | 6.5 | 7 | 2 | 0.8 | 863 |
| 1235 | 3.1 | 7 | 8.4 | 6.5 | 6.5 | 2 | 1 | 1441 |
|  |  | 7 | 12 | 6.5 | 6.5 | 2 | 1 | 1206 |
|  |  | 7 | 15.6 | 6.5 | 6.5 | 2 | 1 | 1058 |
| 1326 | 2.8 | 6.5 | 8.4 | 6.5 | 6 | 2 | 1 | 1548 |
|  |  | 6.5 | 12 | 6.5 | 6 | 2 | 1 | 1295 |
|  |  | 6.5 | 15.6 | 6.5 | 6 | 2 | 1 | 1136 |
| 1442 | 2.5 | 6.5 | 8.4 | 5.5 | 6 | 2 | 1 | 1683 |
|  |  | 6.5 | 12 | 5.5 | 6 | 2 | 1 | 1408 |
|  |  | 6.5 | 15.6 | 5.5 | 6 | 2 | 1 | 1235 |
| 1511 | 2.3 | 7 | 8.4 | 6.5 | 4 | 2 | 1 | 1763 |
|  |  | 7 | 12 | 6.5 | 4 | 2 | 1 | 1475 |
|  |  | 7 | 15.6 | 6.5 | 4 | 2 | 1 | 1294 |
| 1566 | 2.1 | 8 | 9.8 | 6.5 | 4 | 2 | 1.5 | 1828 |
|  |  | 8 | 14 | 6.5 | 4 | 2 | 1.5 | 1530 |
|  |  | 8 | 18.2 | 6.5 | 4 | 2 | 1.5 | 1342 |
| 1845 | 2 | 7.5 | 9.8 | 5 | 4 | 2 | 1.5 | 2153 |
|  |  | 7.5 | 14 | 5 | 4 | 2 | 1.5 | 1801 |
|  |  | 7.5 | 18.2 | 5 | 4 | 2 | 1.5 | 1580 |
| 2091 | 1.6 | 7.5 | 9.8 | 5 | 4 | 2 | 2 | 2441 |
|  |  | 7.5 | 14 | 5 | 4 | 2 | 2 | 2042 |
|  |  | 7.5 | 18.2 | 5 | 4 | 2 | 2 | 1791 |

| PLANE MAXIMUM WIDTH OF NECK [mm] | EFFECT [dB] | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|---|
| 0.5 | 3.1 | 10 | 4.2 | 7 | 13 | 4 | 0.5 | 1204 |
|  |  | 10 | 6 | 7 | 13 | 4 | 0.5 | 1008 |
|  |  | 10 | 7.8 | 7 | 13 | 4 | 0.5 | 884 |
| 1.0 | 3 | 5 | 14 | 6 | 9 | 2 | 1 | 1192 |
|  |  | 5 | 20 | 6 | 9 | 2 | 1 | 997 |
|  |  | 5 | 26 | 6 | 9 | 2 | 1 | 874 |
| 2.0 | 2.6 | 4 | 14 | 7 | 15 | 1.5 | 2 | 1186 |
|  |  | 4 | 20 | 7 | 15 | 1.5 | 2 | 993 |
|  |  | 4 | 26 | 7 | 15 | 1.5 | 2 | 871 |
| 4.0 | 2.2 | 5 | 17.5 | 6.8 | 14 | 1.5 | 4 | 1382 |
|  |  | 5 | 25 | 6.8 | 14 | 1.5 | 4 | 1156 |
|  |  | 5 | 32.5 | 6.8 | 14 | 1.5 | 4 | 1014 |
| 5.0 | 1.8 | 5 | 17.5 | 6.8 | 14 | 1.5 | 5 | 1535 |
|  |  | 5 | 25 | 6.8 | 14 | 1.5 | 5 | 1284 |
|  |  | 5 | 32.5 | 6.8 | 14 | 1.5 | 5 | 1126 |

| PLANE MAXIMUM WIDTH OF AIR CHAMBER [mm] | EFFECT [dB] | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|---|
| 2.0 | 1.8 | 2 | 12.6 | 6 | 13 | 2 | 0.5 | 1200 |
|  |  | 2 | 18 | 6 | 13 | 2 | 0.5 | 1004 |
|  |  | 2 | 23.4 | 6 | 13 | 2 | 0.5 | 881 |
| 3.0 | 2.2 | 3 | 11.9 | 6 | 9 | 2 | 0.5 | 1198 |
|  |  | 3 | 17 | 6 | 9 | 2 | 0.5 | 1002 |
|  |  | 3 | 22.1 | 6 | 9 | 2 | 0.5 | 879 |
| 5.0 | 2.6 | 5 | 10.5 | 6 | 6 | 2 | 0.5 | 1188 |
|  |  | 5 | 15 | 6 | 6 | 2 | 0.5 | 994 |
|  |  | 5 | 19.5 | 6 | 6 | 2 | 0.5 | 872 |
| 10.0 | 2.7 | 10 | 10.5 | 6 | 4 | 1.5 | 1 | 1206 |
|  |  | 10 | 15 | 6 | 4 | 1.5 | 1 | 1009 |
|  |  | 10 | 19.5 | 6 | 4 | 1.5 | 1 | 885 |
| 15.0 | 2.3 | 15 | 7 | 6 | 7 | 2.5 | 1 | 1206 |
|  |  | 15 | 10 | 6 | 7 | 2.5 | 1 | 1009 |
|  |  | 15 | 13 | 6 | 7 | 2.5 | 1 | 885 |
| 20.0 | 1.8 | 20 | 7 | 6 | 8 | 4 | 1 | 1227 |
|  |  | 20 | 10 | 6 | 8 | 4 | 1 | 1026 |
|  |  | 20 | 13 | 6 | 8 | 4 | 1 | 900 |

| PLANE LENGTH OF NECK [mm] | EFFECT [dB] | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|---|
| 1.0 | 1.8 | 15 | 13.3 | 6 | 1 | 2 | 0.5 | 1201 |
|  |  | 15 | 19 | 6 | 1 | 2 | 0.5 | 1005 |
|  |  | 15 | 24.7 | 6 | 1 | 2 | 0.5 | 881 |
| 2.0 | 2.6 | 12 | 10.5 | 6 | 2 | 2 | 0.5 | 1203 |
|  |  | 12 | 15 | 6 | 2 | 2 | 0.5 | 1007 |
|  |  | 12 | 19.5 | 6 | 2 | 2 | 0.5 | 883 |
| 10.0 | 2.8 | 6 | 8.4 | 6 | 10 | 2 | 0.8 | 1204 |
|  |  | 6 | 12 | 6 | 10 | 2 | 0.8 | 1007 |
|  |  | 6 | 15.6 | 6 | 10 | 2 | 0.8 | 883 |
| 30.0 | 2.6 | 6 | 7 | 6 | 30 | 4 | 1 | 1229 |
|  |  | 6 | 10 | 6 | 30 | 4 | 1 | 1028 |
|  |  | 6 | 13 | 6 | 30 | 4 | 1 | 902 |
| 50.0 | 2.3 | 6 | 5.6 | 6 | 50 | 5 | 1 | 1199 |
|  |  | 6 | 8 | 6 | 50 | 5 | 1 | 1003 |
|  |  | 6 | 10.4 | 6 | 50 | 5 | 1 | 880 |
| 60.0 | 1.8 | 6 | 4.55 | 6 | 60 | 5 | 1 | 1217 |
|  |  | 6 | 6.5 | 6 | 60 | 5 | 1 | 1018 |
|  |  | 6 | 8.45 | 6 | 60 | 5 | 1 | 893 |

| PLANE LENGTH OF AIR CHAMBER [mm] | EFFECT [dB] | AIR CHAMBER WIDTH [mm] | AIR CHAMBER LENGTH [mm] | AIR CHAMBER DEPTH [mm] | NECK LENGTH [mm] | NECK DEPTH [mm] | NECK WIDTH [mm] | OPERATION FREQUENCY [Hz] |
|---|---|---|---|---|---|---|---|---|
| 3.0 | 1.8 | 15 | 3 | 6 | 7 | 2 | 0.5 | 1215 |
|  |  | 15 | 3 | 6 | 10 | 2 | 0.5 | 1016 |
|  |  | 15 | 3 | 6 | 13 | 2 | 0.5 | 891 |
| 5.0 | 2.5 | 12 | 5 | 6 | 5.25 | 2 | 0.5 | 1201 |
|  |  | 12 | 5 | 6 | 7.5 | 2 | 0.5 | 1005 |
|  |  | 12 | 5 | 6 | 9.75 | 2 | 0.5 | 881 |
| 15.0 | 2.8 | 6 | 15 | 6 | 5.6 | 2 | 0.8 | 1191 |
|  |  | 6 | 15 | 6 | 8 | 2 | 0.8 | 997 |
|  |  | 6 | 15 | 6 | 10.4 | 2 | 0.8 | 874 |
| 30.0 | 2.7 | 6 | 30 | 6 | 5.6 | 3.5 | 1 | 1216 |
|  |  | 6 | 30 | 6 | 8 | 3.5 | 1 | 1017 |
|  |  | 6 | 30 | 6 | 10.4 | 3.5 | 1 | 892 |
| 50.0 | 2.2 | 6 | 50 | 6 | 4.55 | 5 | 1 | 1208 |
|  |  | 6 | 50 | 6 | 6.5 | 5 | 1 | 1011 |
|  |  | 6 | 50 | 6 | 8.45 | 5 | 1 | 886 |
| 60.0 | 1.6 | 6 | 60 | 6 | 3.5 | 5 | 1 | 1221 |
|  |  | 6 | 60 | 6 | 5 | 5 | 1 | 1021 |
|  |  | 6 | 60 | 6 | 6.5 | 5 | 1 | 896 |

PNEUMATIC TIRE

TECHNICAL FIELD

The present invention relates to a pneumatic tire, more particularly, a tire for passenger vehicle, and specifically proposes a technique for efficiently reducing the air column resonance noise generated by a circumferential groove which continuously and circumferentially extends in a straight, zigzag, or crank line on a tread of a tire, under the action of resonators.

RELATED ART

Air column resonance noise is an undesired sound produced by the resonance of the air in a tube which is surrounded by a circumferential groove which continuously and circumferentially extends on a tread surface of a tire and the road surface within a ground-contact region of the tread surface, and the air column resonance noise is usually observed at frequencies within a range on the order of 800 to 1200 Hz in a general passenger vehicle, and because of a high peak sound pressure and a broad frequency band of the noise, the air column resonance noise constitutes the majority of the noise produced by a tire.

Also, because human audition is especially sensitive to the above described frequency band, the reduction of air column resonance noise is effective in enhancing the silence for a feeling aspect.

As a result, with a view to reduce air column resonance noise, the reduction of volumes of circumferential grooves has been widely performed, and also as disclosed in Patent Document 1, the reduction of air column resonance noise using an antiresonance in an elongated lateral groove which is open to a circumferential groove at one end and terminates in a land portion at the other end has been proposed, and also as described in Patent Documents 2 to 4, a technique for absorbing the energy near the resonance frequency of air column resonance noise using a Helmholtz resonator has been proposed.

Patent Document 1: WO Patent No. 04/103737
Patent Document 2: Japanese Patent Laid-Open No. 5-338411
Patent Document 3: Japanese Patent Laid-Open No. 2000-118207
Patent Document 4: Japanese Patent Laid-Open No. 2001-191734

DISCLOSURE OF THE INVENTION

However, in the prior art in which reduces the volume of a circumferential groove of a tire, the drainage capability of the tire is inevitably lowered. Also in the invention described in Patent Document 1 which involves an arrangement of an elongated lateral groove, there is a problem that it is difficult to secure the design flexibility of tread patterns and appropriate stiffness of land portions.

Meanwhile, it cannot be said that each of the inventions described in Patent Document 2 to 4 discloses any specific and effective method for arranging Helmholtz-type resonators in a tread of a tire with full consideration of the reduction of the collision noise of a land portion of a tire against road surface, the whole performance of the tire such as wear resistance and anti-stone trapping property of the land portion, the mass productivity of the tire, and the like, and such a tire with an effective use of resonators has not been in an advanced stage of development yet.

The present invention is made to solve the problems in the prior art, and one object of the present invention is to provide a pneumatic tire which has sufficient total property and mass productivity of a tire without reducing drainage capability due to the reduction of volume of circumferential grooves, achieves high design flexibility of tread patterns and stiffness of land portions as intended, and also effectively reduces undesired air column resonance noise produced by the circumferential grooves.

A pneumatic tire according to the present invention includes a circumferential groove which continuously and annularly extends in a straight, zigzag, or other like and arranged on a tread surface, and a plurality of resonators which are open to the circumferential groove, more directly to a wall of the circumferential groove, and terminate in a land portion such as a rib, a block, or the like, each of the resonators being configured with an air chamber which is open toward a surface of the land portion, and a narrowed neck as a narrow path for a communication between the air chamber and the circumferential groove, the resonator being arranged so that the plurality of resonators having different resonance frequencies are completely included in a ground contact area of the tire at any moment, when the tire mounted to an applicable rim is inflated with a defined air pressure and is postured to be applied by a load corresponding to 80% of a defined mass.

The term "applicable rim" as used herein means a rim which is defined by the following standard in accordance with the size of a tire, the term "defined air pressure" means an air pressure which is defined corresponding to the maximum loading capability in the following standard, and the maximum loading capability means the maximum mass which is allowed to be applied to a tire in the following standard. The term "defined mass" as used herein means the above described maximum loading capability.

The air herein may be displaced with an inert gas such as nitrogen gas or other.

The standard is the one determined by an industry standard effective in the region where the tire is manufactured or used, and is, for example, the "YEAR BOOK" published by "THE TIRE AND RIM ASSOCIATION INC." in the United States of America, the "STANDARDS MANUAL" published by "THE European Tyre and Rim Technical Organisation" in Europe, and the "JATMA YEAR BOOK" published by Japan Automobile Tires Manufactures Association in Japan.

The term "resonance frequency" as used herein can be expressed by the following formula where the radius of a narrowed neck is r, the length of the neck is $l_0$, the sectional area of the neck is S, the volume of an air chamber is V, and the sound velocity is c:

$$f_0 = \frac{c}{2\pi} \sqrt{\frac{S}{(l_0 + 1.3r) V}} \quad \text{[Formula 1]}$$

The end correction of a tube in the above formula is often obtained by experiments, and the value varies depending on the references, but herein the value of 1.3 r is used.

In the above tire, the difference between the maximum value and the minimum value of the resonance frequencies of the plurality of resonators which are constantly included in a ground contact area is more preferably within a range of from 200 to 800 Hz, particularly from 300 to 600 Hz.

Also, the number of the resonators which are constantly included in a ground contact area is preferably three or more, more preferably four or more, most preferably six or more for each circumferential groove.

Herein, preferably the resonance frequencies of the resonators in the tread pattern to which a pitch variation is applied is adjusted by changing the circumferential dimensions of the air chambers of the resonators in accordance with a length of pitch.

On the tread surface having a tread pattern to which a pitch variation is applied, preferably the resonators having an average of resonance frequencies within a range of from 700 to 1800 Hz are arranged in at least one circumferential pitch.

The term "average of resonance frequencies" as used herein means the average of the resonance frequencies of all of the resonators which are open to a certain circumferential groove along the entire circumference.

In addition, preferably, in at least one circumferential pitch, one or more resonators having a resonance frequency within a range of from 609 to 2153 Hz are arranged.

The resonance frequencies of resonators as described above can be adjusted by changing the width and depth of the narrowed neck itself which affects the sectional area S of neck in the following formula, and also by changing the length $l_0$ of the narrowed neck, as well as the width, depth, and length of the air chamber each of which affects the volume of air chamber V in the following formula:

$$f_0 = \frac{c}{2\pi} \sqrt{\frac{S}{(l_0 + 1.3r) V}} \quad \text{[Formula 2]}$$

And with respect to the volume V of air chamber, a frequency can be adjusted by changing a land portion opening area of the air chamber or an inclination angle of a side wall of the air chamber as parameters.

Herein, a narrowed neck of a resonator may be formed as a sipe. In the case, the radius r of a neck in the above formula for resonance frequency $f_0$ can be obtained by back calculation using a cross-sectional area of the sipe as the sectional area S of neck.

Also herein, the air chamber has an opening toward a land portion surface which may have a rectangular contour or a curved contour, and the air chamber may have a cross sectional area which is equal to the opening area all along the depth direction thereof, or which gradually decrease or increase in the depth direction.

The air chamber may have a bottom wall which has a flat surface, or a convex or concave surface toward the opening, but more preferably the air chamber has a bottom surface with concavity and convexity which has a height difference of 1.6 mm or more.

In any case of the above described tires, preferably, the narrowed neck has a depth which is equal to the depth of the air chamber or less, and has an extending angle relative to the direction of the width of the tread within a range of from 10° to 60°, particularly 20° to 40°, and the opening contour of the air chamber at a land portion surface preferably has an aspect ration within a range of from 2 to 20, particularly 10 or less, and also the opening area of the air chamber toward the land portion surface is gradually decreased outwardly from the tread center in the width direction of the tread, and is larger than the area of the bottom wall of the air chamber, and each narrowed neck has a width which is tapered toward the bottom thereof.

Preferably, the resonator is configured with one air chamber which is open at a land portion surface, and two or more narrowed necks which are open separately from the chamber to a groove wall of a common circumferential groove for communication between the air chamber and the circumferential groove.

In this case, the two or more narrowed necks may be configured with one neck which is branched to two or more in the middle, or with completely separate necks without any crossing and branching therebetween.

The resonance frequency in a case where a plurality of separate narrowed necks, for example two narrowed necks are arranged to one air chamber can be expressed by the following formula:

$$f_0 = \frac{c}{2\pi} \sqrt{\frac{2(S_1 + S_2)}{\{(l_{01} + 1.3r_1) + (l_{02} + 1.3r_2)\} V}} \quad \text{[Formula 3]}$$

narrowed neck 1: $l_{01}$, $r_1$, $S_1$
narrowed neck 2: $l_{02}$, $r_2$, $S_2$
and the narrowed necks have cross sectional areas the total of which (the total cross sectional area) affect the resonance frequency, or have lengths the average of which affects resonance frequency.

Here, in the case where three or more narrowed necks are used, the above formula is changed by adding the term ($l_0$+1.3 r) and S in the root depending on the number of the narrowed necks and setting the coefficient of the numerator to correspond the number.

The resonance frequency in the case where a narrowed neck is branched to two or more in the middle can be calculated using the above formula on the assumption that a plurality of narrowed necks are bundled in one before branching.

In any one of the above described pneumatic tires, the air chamber preferably has an opening area toward a land portion surface within a range of from 25 to 300 mm$^2$, particularly 72 to 180 mm$^2$, more particularly 100 to 150 mm$^2$, and the narrowed neck preferably has the plane maximum width which is within a range of from 3 to 50% of the plane maximum width of the air chamber, particularly 3 to 20%, more particularly 3 to 15%.

In a pneumatic tire according to the present invention, a Helmholtz type resonator having an air chamber and a narrowed neck as a narrow path is open to a circumferential groove, and the resonator has a resonance frequency corresponding to that of the circumferential groove, so that a first resonance energy of the circumferential groove is absorbed by the air vibration in the narrowed neck of the resonator, as the result of that the air column resonance noise in the circumferential groove is effectively reduced without reducing the groove volume of the circumferential groove.

In the tire, because the air chamber of the resonator is formed to be open toward a land portion surface, even when a vulcanization molding of a green tire is performed by pressing in a die portion to a portion corresponding to the air chamber, the die portion can be smoothly and securely removed from an air chamber of a product tire without fail, independently of the cross-sectional area of the air chamber which may be slightly variable in the depth direction thereof, as the result of that the tire can be easily manufactured in the same way as that for general tires of the prior art which do not include resonators.

Such an air chamber which is open toward a land portion surface also defines a closed space in a ground contact area of a tread when a road surface closes the opening, which enables the air chamber to fulfill the function as a resonant chamber.

In addition, the resonators are arranged so that a plurality of resonators having different resonance frequencies are constantly and completely included in a ground contact area when the tire is postured to be applied by a load corresponding to 80% of a defined mass which is most frequently used, which enables an effective reduction of air column resonance noise noises in a broad frequency band at circumferential grooves by the plurality of resonators having different resonance frequencies at one time, independently of the position of the rolled tire.

Thus, in the pneumatic tire, the air chamber and eventually the resonators are allowed to effectively fulfill the original function without reducing drainage capability due to the reduced volume of a circumferential groove, and without lowering the die releasability, in other words, the mass productivity of the tire, and also a resonator design is allowed in consideration with the improvement of operability due to an appropriate arrangement of land portions, wear resistance of the land portions when two-dimensionally designed, collision noise of the land portions with road surface, and the like.

In the tire, when the plurality of resonators which are constantly included in the ground contact area have resonance frequencies with the difference between the maximum value and the minimum value of the frequencies being within a range of from 200 to 800 Hz, preferably 300 to 600 Hz, the air column resonance noise across a broad frequency band can be effectively reduced.

That is, with the difference of less then 200 Hz, as compared with the case where the plurality of resonators having an identical resonance frequency are included in the ground contact area, a significantly increased effect of noise reduction cannot be expected, while with a dispersion of resonance frequencies of the plurality of resonators within a range over 800 Hz, the range exceeds the frequency band of the air column resonance noise at the circumferential groove, thereby a significant effect of noise reduction cannot be expected.

Moreover, when the number of the resonators that have different resonance frequencies and are included in the ground contact area simultaneously at any moment is three or more, preferably four or more, more preferably six or more for each circumferential groove, the size of each resonator itself is reduced, but as a result, a larger effect of noise reduction can be obtained. This may be because the resonators are disposed for a longer time around the position below the central axis of the tire where the sound pressure amplitude is maximized in the circumferential groove.

To the contrary, when only two resonators are included in the ground contact area, as compared with the case with one resonator, no significant effect can be obtained.

Also, when the dimensions of the air chamber of the resonator are varied depending on a length of pitch accompanied by the application of pitch variation, in applying the pitch variation, the circumferential length of the air chamber can be varied depending on the pitch length, which facilitates the arrangement of the resonators.

In addition, the resonance frequency of the resonator can be varied depending on the pitch length, as the result of that the resonator is able to operate in a broader frequency band.

Moreover, when the resonators having resonance frequencies the average of which is within a range of from 700 to 1800 Hz, particularly 700 to 1400 Hz are arranged in at least one circumferential pitch, the resonators completely included in the ground contact area effectively address the air column resonance noise in the circumferential groove in a ⅓ octave band with 800 to 1250 Hz which is usually recognized as unpleasant noise by drivers, which advantageously contributes to the reduction of noise in a high sound area of 1000 to 2000 Hz that is called high frequency noise.

Furthermore, when one or more resonators having resonance frequencies within a range of from 609 to 2153 Hz are arranged in at least one circumferential pitch, the arrangement is found to have a significant effect in reducing air column resonance noise.

The resonator may have a narrowed neck of a tunnel shape which is not exposed to a surface of a land portion, but when the narrowed neck is formed using a sipe which is open toward a land portion surface, the sipe can be simply and easily molded as intended using a vulcanizing die or the like, regardless of a length, a depth, an extending manner, and the like required for the sipe, which further facilitates the manufacture of the resonator and eventually the tire.

Also, the sipe having a sufficient depth effectively prevents the elimination of the narrowed neck even when the tread land portion is progressively worn, and allows the resonator to sufficiently to fulfill its function for a long term.

In the case, the sipe may be a so-called flask-shaped sipe which has an enlarged space portion at the bottom thereof, so that the possibility that the narrowed neck is unexpectedly blocked can be effectively excluded under the effect of the enlarged space portion.

When the air chamber has an opening toward a land portion surface of a polygonal contour shape for easy manufacturing, the air chamber is arranged so that every side of the polygon is not positioned along the leading edge and the trailing edge of the ground contact area of the tire, which restrains the generation of pitch noise due to collision of the opening edges of the air chamber with road surface. When the air chamber has an opening of a polygonal contour shape, the volume of air chamber can be easily set, which facilitates the design of the resonators for more effective operation.

To the contrary, when the air chamber has an opening of a curved contour shape such as a circle, an oval, or the like, the air chamber arranged and positioned as required advantageously restrains the generation of pitch noise, and also limits the generation of uneven wearing of the opening edge portion.

In addition, when the air chamber has a bottom wall provided with a convex-concave structure having a height of 1.6 mm or more, stone trapping to the air chamber can be advantageously prevented, and more effect can be obtained when the convex-concave structure has a height of 3.0 mm or more.

In such a pneumatic tire, when the narrowed neck has a depth equal to that of the air chamber, the narrowed neck is abraded almost over the same period as the air chamber being abraded, thereby as compared with a case where one of the narrowed neck and the air chamber remains with less abrasion for a long term, the stiffness level difference of land portions is eliminated, and the generation of uneven wearing can be advantageously prevented.

To the contrary, when the narrowed neck has a depth smaller than that of the air chamber, in the case where the resonance frequencies of the resonators are changed too much to contribute to the reduction of air column resonance noise in the circumferential groove due to the reduction of the volume of air chamber after the tread ground contact area is worn, the abrasion of the narrowed neck causes the resonators to stop functioning.

When the narrowed neck has an extending angle within a range of from 10° to 60°, particularly 20° to 40° relative to the width direction of the tread, with the narrowed neck being open toward a land portion surface, both of the generation of uneven wearing and the generation of pitch due to collision of the edges of the narrowed neck with road surface can be effectively prevented.

In other words, with the extending angle of less than 10°, a relatively large pitch noise may be generated by the narrowed neck, while with the extending angle of above 60°, there is a high possibility that uneven wearing is generated at an acute-angled corner portion between the narrowed neck and the circumferential groove of the land portion.

Also, when the air chamber has an opening toward a land portion surface having a contour at an aspect ratio within a range of from 2 to 20, more preferably 10 or less, the air chamber sufficiently fulfills its original function while the generation of pitch noise and uneven wearing can be restrained.

That is, with an aspect ratio of less than 2, the air chamber may operate like a local void and increase pitch noise and uneven wearing, while with an aspect ratio of over 20, the resonator hardly produces a resonance at a required frequency.

When the opening area of the air chamber toward a land portion surface is gradually decreased outwardly from the central part of the tread in the width direction of the tread, the occupancy of the air chamber which operates like a void and is likely to be the core of uneven wearing can be effectively reduced from the side region of the tread ground contact area which is susceptible to uneven wearing.

When the air chamber has an opening area toward a land portion surface which is larger than the bottom surface area, even if stone trapping occurs to the air chamber, the stone can be smoothly removed from the air chamber, and also in a vulcanization molding of green tire, the air chamber can be more easily manufactured.

When the narrowed neck has a width which tapers to the bottom thereof, the resonance frequencies can be maintained as intended by decreasing the sectional area of the neck corresponding to the decreased volume of the air chamber due to the wearing of the air chamber.

Moreover, when the resonator is configured with one air chamber which is open toward a land portion surface, and two or more narrowed necks which are separately open to a wall of a common circumferential groove for communication between the air chamber and the circumferential groove, for example, the drainage capability can be improved by draining the water which entered into the air chamber via one of the narrowed necks through the other narrowed neck to a circumferential groove while the effect of noise reduction is secured, and also, in terms of the adjustment and design of land portion stiffness, the design flexibility of tread pattern can be enhanced.

In this case, when a plurality of narrowed necks are formed completely separately from each other, a particularly excellent drainage capability is secured, while when a plurality of narrowed necks are formed by branching one or a plurality of narrow necks in the middle, the adjustment of stiffness of tread land portion is facilitated, and also the properties including uneven wearing can be improved.

Furthermore, when the air chamber has an opening area toward a land portion surface within a range of from 25 to 300 $mm^2$, more preferably 72 to 180 $mm^2$, further preferably, 100 to 150 $mm^2$, the air chamber is allowed to effectively fulfill its original function, and also the increase of the collision noise of the opening edge of the air chamber with road surface, that is the increase of pitch noise, and the uneven wearing of the opening edge itself of the air chamber can be effectively restrained.

That is, when the opening having an area of less than 25 $mm^2$, a thin and elongated narrowed neck is necessary to allow the air chamber to sufficiently fulfill its function as a resonance chamber, but in the case there is a high possibility that the neck is closed, which makes it difficult to obtain the noise reduction effect by the resonator as intended without fail. While with the area over 300 $mm^2$, inevitably a pitch noise is increased and an early uneven wearing is generated due to the degraded operability which is caused by the stiffness of land portion, the increased length of the opening edge, and the like.

In the above described tire, when the narrowed neck has the plane maximum width which is within a range of from 3 to 50%, more preferably 3 to 20%, further preferably 3 to 15% of the plane maximum width of the air chamber as seen in a developed plan view of tread pattern, the narrowed neck and the air chamber are allowed to sufficiently fulfill the functions as intended.

That is, with the plane maximum width of the narrowed neck of less than 3%, the neck is sealed, which makes it difficult to constantly achieve the effect of noise reduction as required without fail, while the width over 50%, the neck has too large air volume therein, which makes it difficult to obtain a sufficient amplitude of oscillation of the air at a resonance frequency, as the result of that the effect of noise reduction is decreased.

BRIEF DESCRIPTION OF THE DRAWINGS

FIGS. 7(a) to (c) are views showing a plane form of a resonator, and resonator arrangement manners;

FIG. 10 is a view showing the results of Example 4;

FIGS. 13(a) and (b) are a sectional view and a plan view showing a modified example of a resonator;

Figure 1:
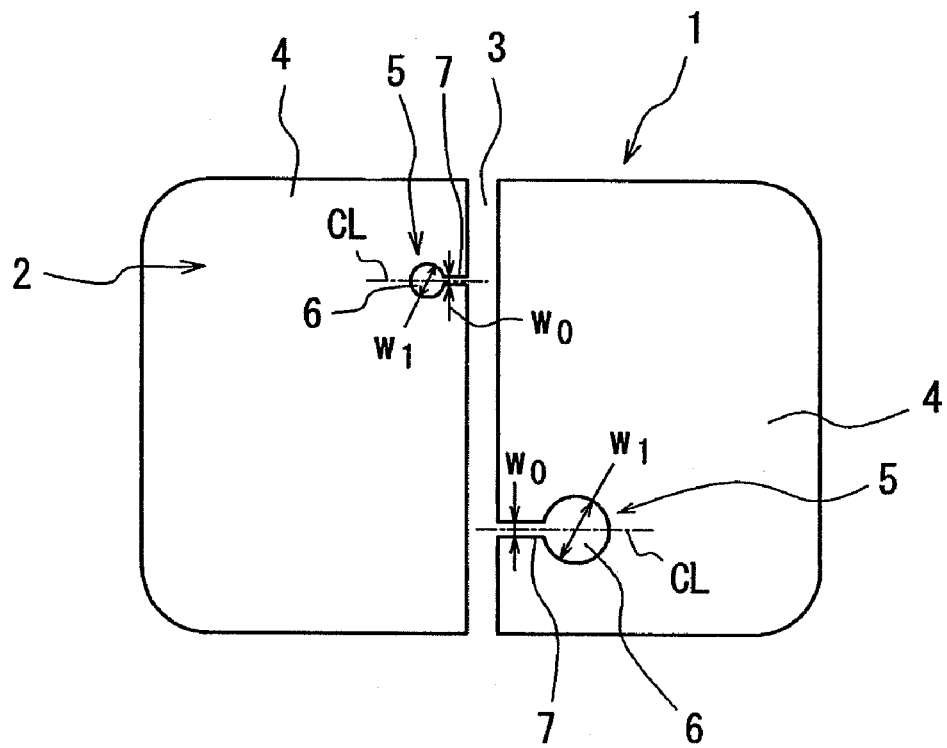
FIG. 1 is a view schematically showing a ground contact surface of an embodiment of the present invention.

DESCRIPTION OF SYMBOLS 1 tread surface
2 ground contact area
3 circumferential groove
4 land portion
4a block
5, 5a, 5b, 5c, 15 resonator
6, 16 air chamber
6d projection
7, 17a, 17b narrowed neck
δ level difference between concavity and convexity
θ extending angle
CL plane central line
$w_0$, $w_1$ plane maximum width
$l_0$, $l_1$ plane length

BEST MODE FOR CARRYING OUT THE INVENTION

FIG. 1 is a view schematically showing an embodiment of the present invention, and in FIG. 1, reference numeral 1 denotes a tread surface, specifically a ground contact area 2 which contacts a road surface when the tire mounted to an applicable rim is inflated with a defined air pressure and is postured to be applied by a load corresponding to 80% of a defined mass, and reference numeral 3 denotes a circumferential groove which circumferentially runs in the central part of the ground contact area 2 to continually extends in a straight line for example to form a loop as a whole.

In the present embodiment, resonators 5 are provided, each of which having one end open to the circumferential groove 3 formed as described above and the other end terminating in a land portion 4, and being configured with an air chamber 6 which is positioned on the other end side to be open toward a surface of the land portion 4 and has a required volume, and a narrowed neck 7 which can be embedded in the land portion 4 for communication between the air chamber 6 and the circumferential groove 3 as a narrow path, and a plurality of the resonators 5, two resonators 5 in FIG. 1, are completely included in the ground contact area 2 simultaneously at any moment, and the two resonators 5 have different resonance frequencies from each other.

Figure 2:
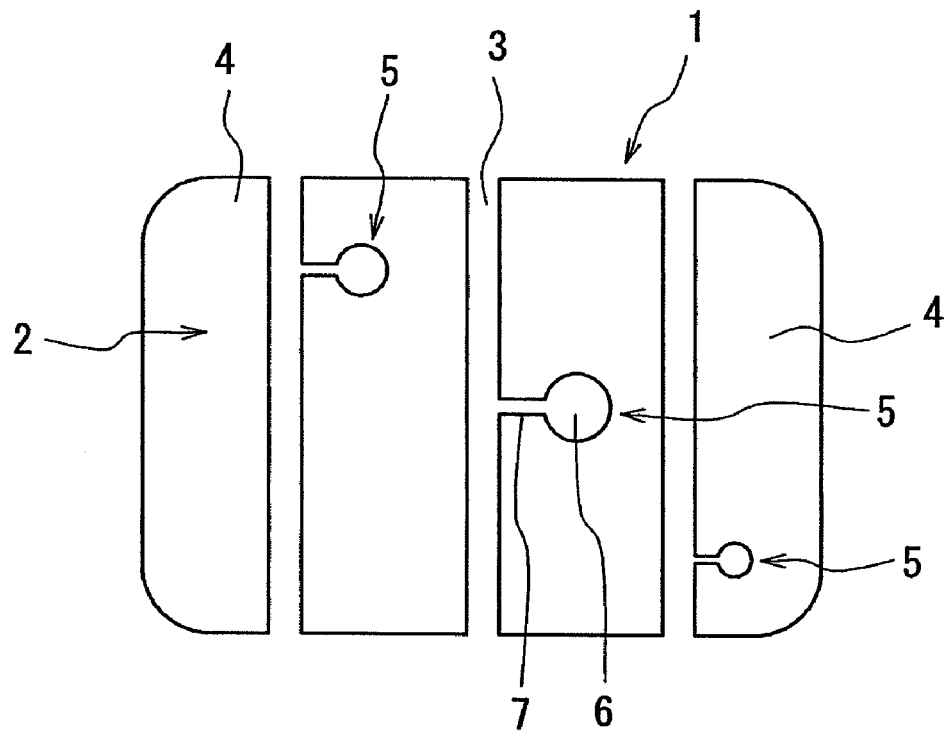
FIG. 2 is a view schematically showing a modified example of FIG. 1.

In the present embodiment, the plurality of the resonators 5 which are included in the ground contact area simultaneously at any moment have to have at least two resonance frequencies, thereby even when three or more resonator 5 are included for one circumferential groove 3 in the ground contact area 2 for example, the number of the resonance frequency types may be two or more, and also when resonators 5 are provided to each of a plurality of circumferential grooves 3, as illustrated in FIG. 2, the resonators 5 provided to one circumferential groove 3 may have two or more, three in FIG. 2, different resonance frequencies.

In the present embodiment, the air chamber 6 has an opening area toward a land portion surface within a range of from 25 to 300 mm² for example, more preferably 100 to 150 mm², and the cross-sectional area and the contour shape of the cross section of the air chamber 6 which is parallel to the land portion surface may be, of course, the same as those of the opening at the land portion toward the bottom wall side of the air chamber 6, and also may be gradually increased or, on the contrary, decreased as far as the die portion can be removed from the air chamber 6 of the tire after vulcanization molding without any restraint.

Figure 3:
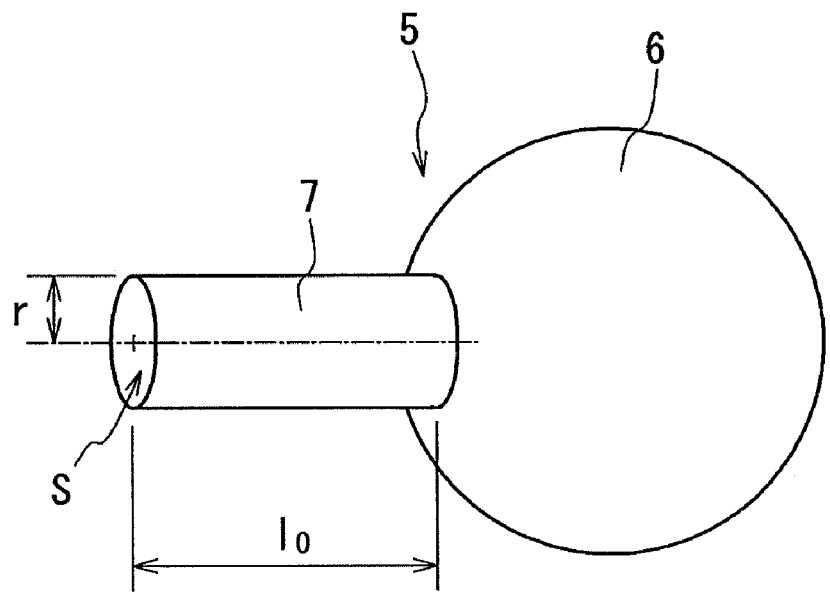
FIG. 3 is a view schematically showing a Helmholtz type resonator.

The resonator 5 which can be configured as described above form Helmholtz type resonators as shown in FIG. 3 when both of the land portion opening and the narrowed neck 7 of the air chamber 6 are sealed by a road surface, and as described above, a resonance frequency $f_0$ of the resonator 5 can be expressed by the following formula where the radius of the narrowed neck 7 is r, the length of the narrowed neck 7 is $l_0$, the sectional area of the neck is S, the air chamber volume is V, and the sound velocity is c:

$$f_0 = \frac{c}{2\pi} \sqrt{\frac{S}{(l_0 + 1.3r)\,V}} \quad \text{[Formula 4]}$$

Therefore, a resonance frequency $f_0$ can be conveniently adjusted as required by directly or indirectly selecting the radius of neck r, the neck length $l_0$, the sectional area of neck S, and the volume of air chamber V with respect to the resonant frequency of the air column of the circumferential groove 3 as described above.

As for such a resonance frequency $f_0$, preferably, the resonators 5 having the average frequency within a range of from 700 to 1800 Hz, particularly 700 to 1400 Hz are arranged in at least one circumferential pitch on the tread having a tread pattern to which a pitch variation is applied.

It is also preferred that a plurality of resonators 5 which are included in the ground contact area 2 simultaneously at any moment have resonance frequencies $f_0$ with a difference between the maximum value and the minimum value of the frequencies being across a range of from 200 to 800 Hz so as to achieve the reduction of noise more effectively, which is more effective when the average of resonance frequencies $f_0$ of the resonators 5 is specified to be within a range of from 700 to 1800 Hz.

Figure 4:
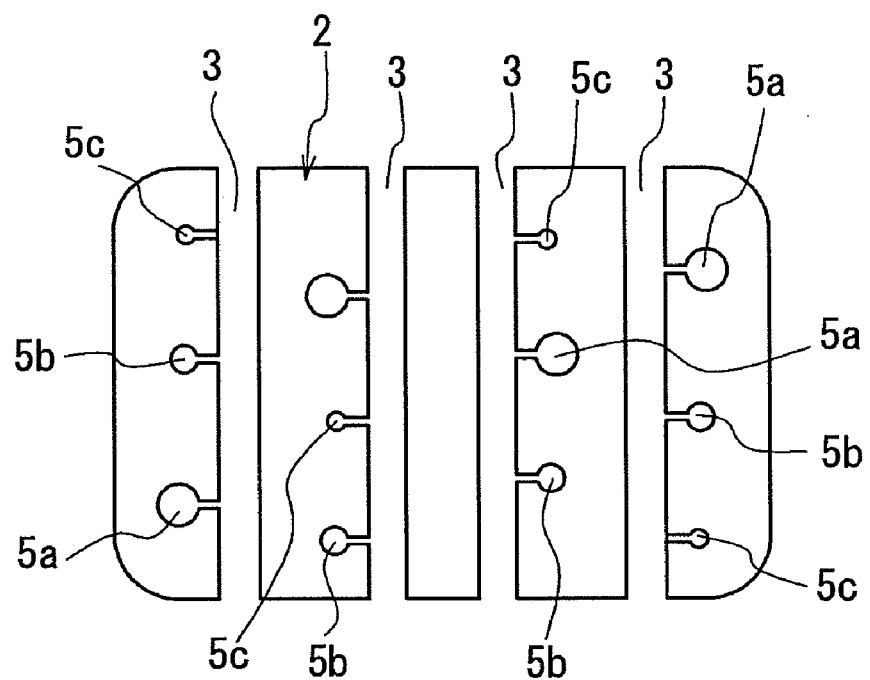
FIG. 4 is a view illustrating a resonator arrangement manner in a ground contact area.

In the present embodiment, the resonators 5 are preferably arranged so that, as illustrated in FIG. 4, three or more resonators 5 are included in a ground contact area simultaneously at any moment for each circumferential groove, and in the case, all of the resonators which are open at one circumferential groove 3 may have a common resonance frequency $f_0$, but, as shown, it is more preferred that the resonators are resonators 5a, 5b, 5c having different resonance frequencies $f_0$ from each other.

When the resonators which are open at one circumferential groove 3 have different resonance frequencies $f_0$ from each other, it is advantageous in facilitating the design of arrangement of resonators to change the circumferential dimension of the air chamber 6 of each resonator, eventually the air chamber volume, depending on the pitch length after a pitch variation is applied.

As shown FIGS. 1, 2, and 4, the air chamber 6 has an opening toward a land portion surface of a circular contour shape, but the opening may have an oval or other curved contour shape, and also may have a square or other polygonal contour shape.

In such a resonator 5, the narrowed neck 7 may be, as illustrated in the main part perspective view of FIG. 5(a), the tunneled one which is embedded in the land portion 4, a block 4a in the present embodiment, or as shown in FIG. 5(b), the one which is open at a surface of the block 4a. When the latter open neck 7 is formed by pressing in a vulcanizing die blade or the like for example, the narrowed neck 7 in addition to the air chamber 6 also can be easily formed.

In the case, the narrowed neck 7 can be formed as a sipe.

The sipe has a so-called flask-like shape, and is configured with an enlarged space portion at the bottom thereof as illustrated in FIG. 5(c), and for example, a portion other than the space portion is so narrow that sipe walls contact with each other in a ground contact area, so that the narrowed neck 7 can have various dimensions which are constantly the same as in the case shown in FIG. 5(a).

Figure 5:
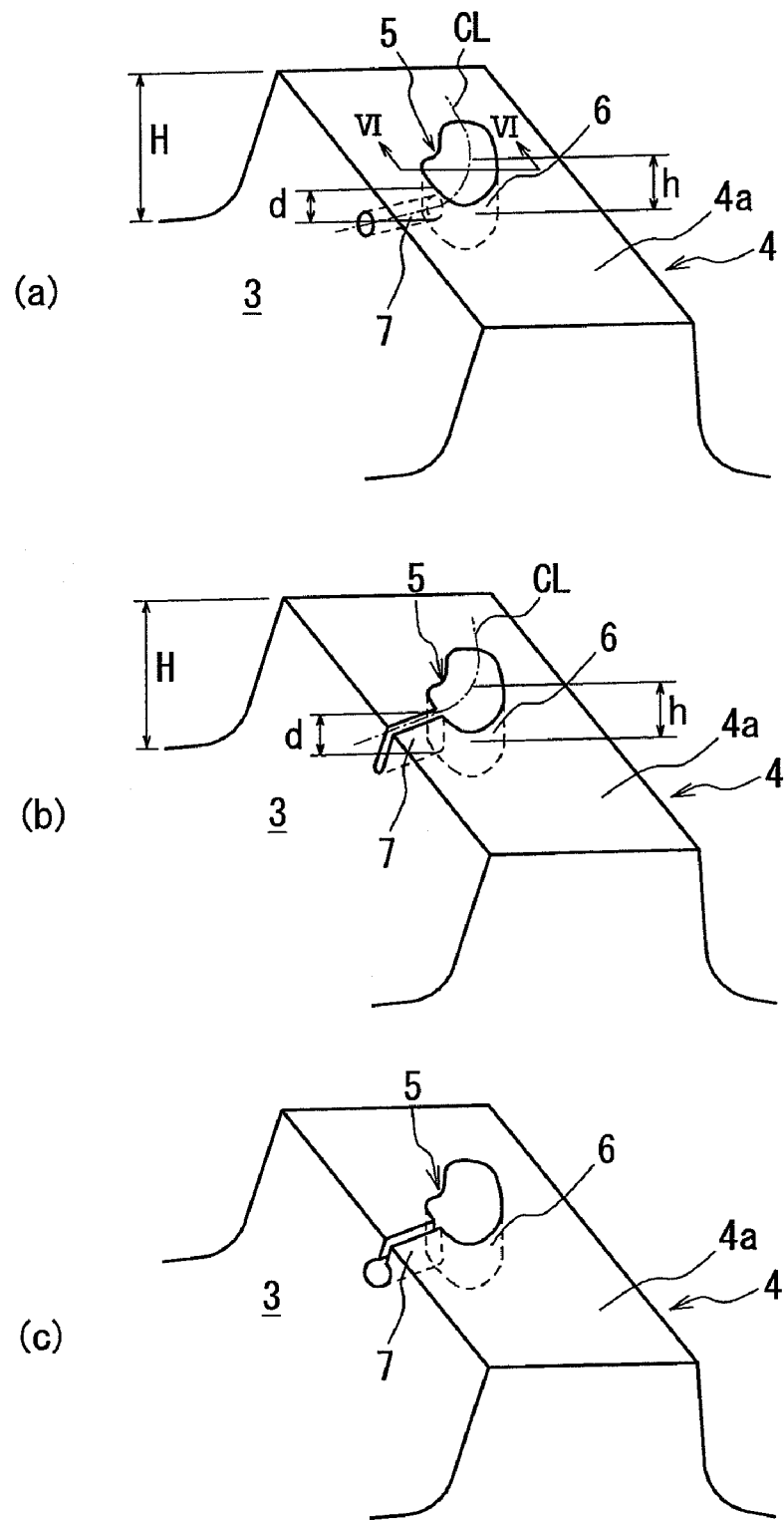
FIGS. 5(a) to (c) are main part perspective views illustrating a resonator formation manner.

FIG. 5 shows that the opening of the air chamber 6 at the block surface has an irregular contour shape which is consisted of a curved line, but needless to say, the shape may be conveniently changed into another contour shape including a circle and a rectangle as required.

Figure 6:
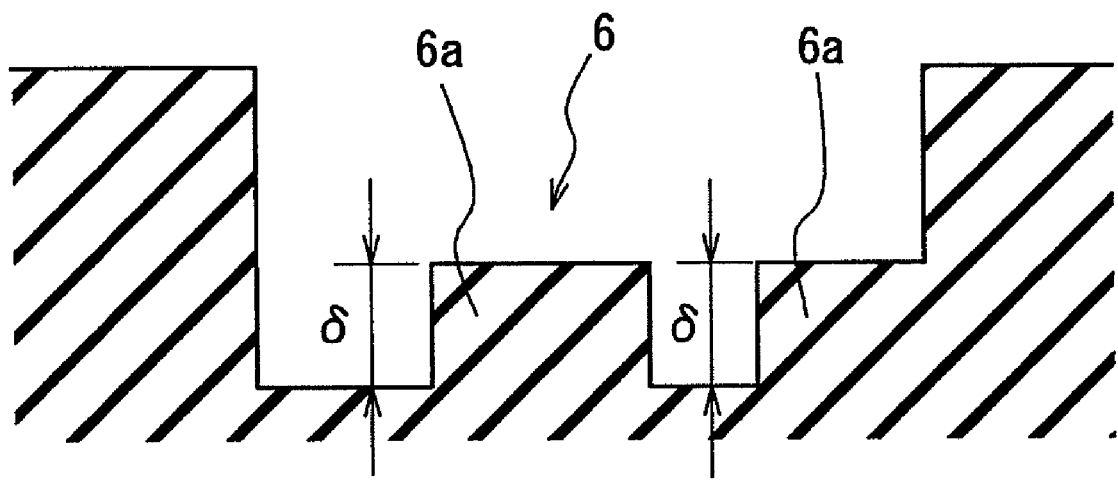
FIG. 6 is an enlarged sectional view showing a bottom wall of the air chamber taken along the line VI-VI of FIG. 5(a)

In the above description, the air chamber 6 may have a bottom wall of a flat surface, a convex surface, or a concave surface toward the opening, but more preferably, as shown in FIG. 6 which is an enlarge view of a cross section taken along the line VI-VI in FIG. 5(a), the air chamber has a bottom surface having one or more upward projection 6a as concavity, so that the surface has the concavity and convexity difference 6 of 1.6 mm or more, more preferably 3.0 mm or more.

The projection 6a in the case may be formed on a side wall of the air chamber to be independent of the bottom wall, in other words, separate from the bottom wall.

EXAMPLE 1

A tire (size: 195/65R15) mounted to a 6JJ rim and inflated with an air pressure of 210 kPa is rotated at a speed of 80 km/h with a load of 4.47 kN applied thereto using an indoor drum tester, and the sound on both sides of the tire is measured according to the condition specified in JASO C606 to obtain partial overall values in a 1/3 octave band with center frequencies of 800 Hz, 1000 Hz, and 1250 Hz.

In this case, the result of a reduction of sound pressure by 2 dB or more is determined to be effective because the amount of reduction can be expected to improve the feeling evaluation by a driver in a real car test.

The resonator had the resonance frequency $f_0$ obtained by the following formula as described above:

$$f_0 = \frac{c}{2\pi} \sqrt{\frac{S}{(l_0 + 1.3r)\, V}} \quad \text{[Formula 5]}$$

In the present example, the sound velocity c is 343.7 m/s.

The measured result with a conventional tire having a ground contact area with four straight circumferential grooves extending therein, each of the groove having a groove width of 8 mm and a groove depth of 8 mm, and the measured result with the Example tire having sixty resonators arranged in the manner shown in FIG. 7(b) on the circumference at a pitch of 33.4 mm, the resonators being arranged to each of four straight circumferential grooves extending in a ground contact area of the tire and having a groove width of 8 mm and a groove depth of 8 mm, and as shown in FIG. 7(a), each of the resonators having a plane form with an air chamber which is provided with a rectangular opening at a land portion surface, so that three types of resonators included in the ground contact area simultaneously at all the time had resonance frequencies of about 800 Hz, about 1000 Hz, and about 1250 Hz as shown in Table 1 were compared, to find the result in an effect of noise reduction by 3.3 dB in the Example tire.

To the contrary, in the case of the comparative tire provided with resonators included in the ground contact area simultaneously at all the time which had only one type of the resonance frequency of 1014 Hz, the effect relative to the conventional tire is a noise reduction by 2.6 dB.

TABLE 1

| Width of Air Chamber [mm] | Length of Air Chamber [mm] | Depth of Air Chamber [mm] | Length of Neck [mm] | Depth of Neck [mm] | Width of Neck [mm] | Operation Frequency [mm] |
|---|---|---|---|---|---|---|
| 6 | 12 | 4 | 6 | 2 | 0.5 | 1242 |
| 6 | 12 | 6 | 6 | 2 | 0.5 | 1014 |
| 7 | 16 | 6 | 6 | 2 | 0.5 | 813 |

According to Table 1, in the Example tire, the result shows that a larger effect can be obtained by operating individual resonators at frequencies in a broad band at the same time.

EXAMPLE 2

The difference of noise level between the Example tire having resonators which were arranged as shown in FIG. 7(b) and had different resonance frequencies $f_0$ in each band and the above conventional tire is obtained as in the case of Example 1.

Figure 8:
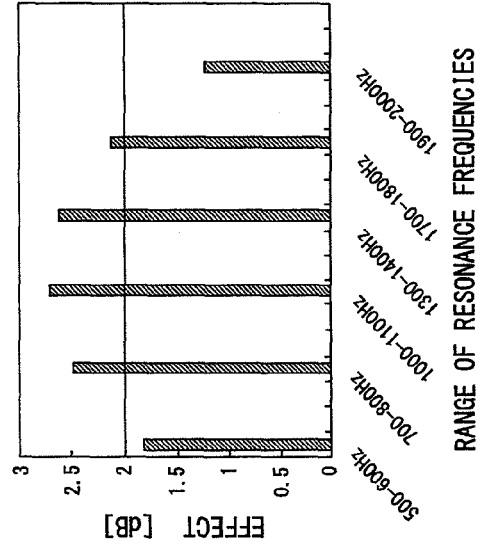
FIG. 8 is a view showing the results of Example 2.

The resulting effect of noise reduction in the Example tire is shown in FIG. 8.

According to FIG. 8, with the average of the resonance frequencies $f_0$ within a range of from 700 to 1800 Hz, a target result of reduction of air column resonance noise by 2 dB or more can be obtained, and particularly, with a range of from 700 to 1400 Hz, obviously the effect is significantly large.

EXAMPLE 3

The noise by the Example tire having resonators which were arranged to each circumferential groove so that three types of resonators were included in a ground contact area simultaneously at any moment, with one resonator having a fixed middle resonance frequency of about 1000 Hz and the other two resonators individually having a higher resonance frequency and a lower resonance frequency than the about 1000 Hz, and that by the above conventional tire were measured as in the case of Example 1.

Figure 9:
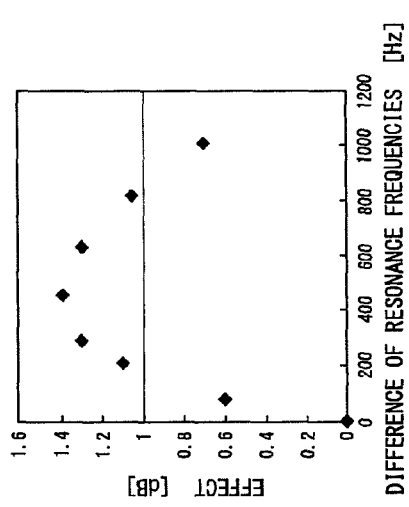
FIG. 9 is a view showing the results of Example 3.

The resulting noise reduction effects were organized based on the difference between the maximum value and the minimum value of the resonance frequencies in the Example tire as a parameter, which is shown in FIG. 9.

In the present example, with a desired level effect by 1 dB or more reduction as compared to that in the case where the difference between the resonance frequencies is 0 (all of three resonators have the resonance frequency of about 1000 Hz), the large effects in reducing noise were obtained at a frequency difference within a range of from 200 to 800 Hz, particularly 300 to 600 Hz.

EXAMPLE 4

The noise produced by the Example tire in which various number of resonators were included in a ground contact area for each circumferential groove and the resonators had two or more different resonance frequencies, and the noise produced by the above conventional tire were measured as in the case of Example 1.

The resulting effects of noise reduction in the Example tire are shown in FIG. 10.

According to FIG. 10, with a desired level effect by 1 dB or more noise reduction effects as compared to that in the comparative tire having only one resonator in a ground contact area, the results show that three or more resonators included in a ground contact area further enhance the effect, which is more obvious as the number of the resonators is increased.

Between the above tires having a different number of the resonators, for an equitable comparison, the ranges of resonance frequencies were set to be approximately the same, and also the total volumes of the air chambers were the same.

EXAMPLE 5

The effect of noise reduction in the Example tire having a plurality of resonators which individually had an air chamber with an opening of a circular contour shape and were arranged in the manner as shown in FIG. 4 in a ground contact area, each of the resonators having the dimensions as shown in Table 2 so as to adjust the resonance frequency (operation frequency) to that in Table 1, as compared to the effect in the conventional tire, is obtained, which resulted in 3.35 dB.

TABLE 2

| Radius of Air Chamber [mm] | Depth of Air Chamber [mm] | Length of Neck [mm] | Depth of Neck [mm] | Width of Neck [mm] | Operation Frequency [Hz] |
|---|---|---|---|---|---|
| 4.8 | 4 | 6 | 2 | 0.5 | 1242 |
| 4.8 | 6 | 6 | 2 | 0.5 | 1014 |
| 6.0 | 6 | 6 | 2 | 0.5 | 813 |

Therefore, according to the table, the results show that the similar noise reduction effect can be obtained by selecting resonance frequencies of resonators as required independently of the opening shape of the air chamber toward a land portion surface, and that the air chamber which functions as a resonance chamber can fulfill the function as a resonator even when the air chamber is configured by a combination of a simple two-dimensional shape and a depth which is easy to form.

EXAMPLE 6

Figure 11:
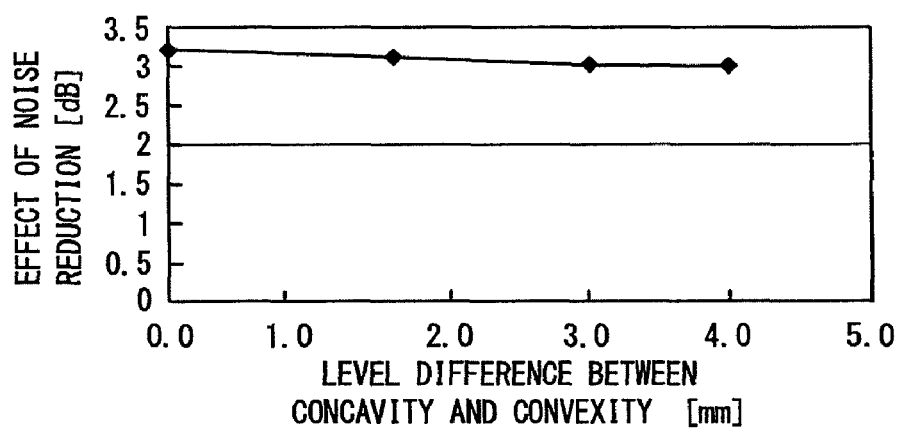
FIG. 11 is a view showing the results of Example 6.

The Example tire which is set to be under the same conditions as those described in Example 1 and had resonators with air chambers having bottom walls that were individually provided with projections to have concavity and convexity differences of 1.6 mm, 3.0 mm, and 4.0 mm is used to drive on a gravel road of test course so as to examine the presence/absence of stones trapped in the air chamber and the narrowed neck, to find that some stones trapped in the air chamber having a bottom wall without a concavity and convexity difference, but no stone trapping is found in the Example tire with projections, as shown in FIG. 11.

The resonator provided with a projection at the air chamber bottom wall ensures, as clearly seen from the graph of FIG. 11, the volume of air chamber as required, and is able to fulfill the function to reduce noise as intended as long as the convex-concave structure does not divide the air chamber.

EXAMPLE 7

Figure 12:
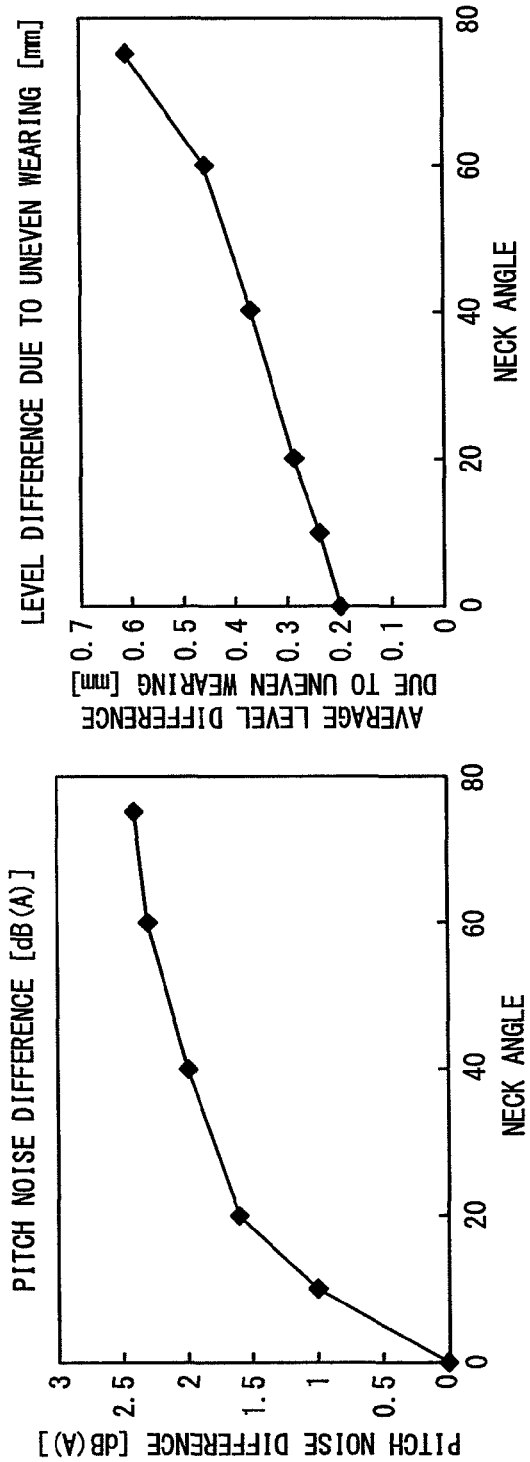
FIG. 12 is a view showing the results of Example 7.

A generated pitch noise and a level difference due to uneven wearing were obtained by changing, as shown in the table of FIG. 12, the extending angles relative to the width direction of the tread of the narrowed necks of the resonators which were included in a ground contact area and individually had resonance frequencies of 813 Hz, 1014 Hz, and 1242 Hz, the results of which are shown in the graph of FIG. 12. The present example is same as that described in Table 1 except that neck angles were changed.

In the present example, the pitch noise is measured according to JASO C606 using an indoor drum tester on a smooth road surface with one microphone, and a difference of minus 1 dB or more as compared to that at the neck angle of 0 degree at the first order peak of the pitch noise is considered significant (in consideration with the value which is determined to be a difference in real car feeling).

The conditions for measurement were the same as those in Example 1.

The requirement for a level difference due to uneven wearing is that a level difference average of 0.5 mm or less is obtained when the amounts of the level difference due to uneven wearing were measured at the front and back of the neck portion (circumferentially) after driving of 1000 km using the indoor drum tester.

The driving condition is set to include 10 repetitions of a set of 10 km of braking at 0.1 G and 90 km of free rolling.

Other various conditions (loading, inner pressure, speed, and the like) were the same as those in Example 1.

According to the graph of FIG. 12, the results show that the pitch noise difference is effectively improved at the neck angle of 10° or more, particularly 20° or more, and that the average of level differences due to uneven wearing is efficiently reduced at the neck angle of 60° or less, particularly 40° or less.

In the pneumatic tire as described above, the narrowed neck 7 has a depth which may be the same as that of the air chamber 6 as illustrated in FIG. 13(*a*) as the cross sectional view of the resonator 5, or may be smaller than that of the air chamber 6 as illustrated in FIG. 13(*a*) by the imaginary line.

Meanwhile, the narrowed neck 7 preferably has an extending angle $|\theta|$ within a range of from 10° to 60°, particularly 20° to 40° relative to the width direction x-x of the tread, as shown in the plan view of the resonator 5 of FIG. 13(*b*).

Also, preferably, the air chamber 6 has an opening toward a land portion surface, the opening having a contour of an aspect ratio (in the example of FIG. 7(*a*), the ratio of air chamber length/air chamber width) within a range of from 2 to 20, particularly 10 or less.

The opening area of the air chamber 6 toward a land portion surface is preferably gradually decreased outwardly from the central part of the tread in the width direction of the tread, and the opening area of the air chamber 6 toward a land portion surface is preferably larger than the area of the bottom wall of the air chamber 6 as illustrated in the cross sectional view of FIG. 13(*a*).

Not shown, but the narrowed neck 7 preferably has a width which tapers toward the bottom portion thereof.

Figure 14:
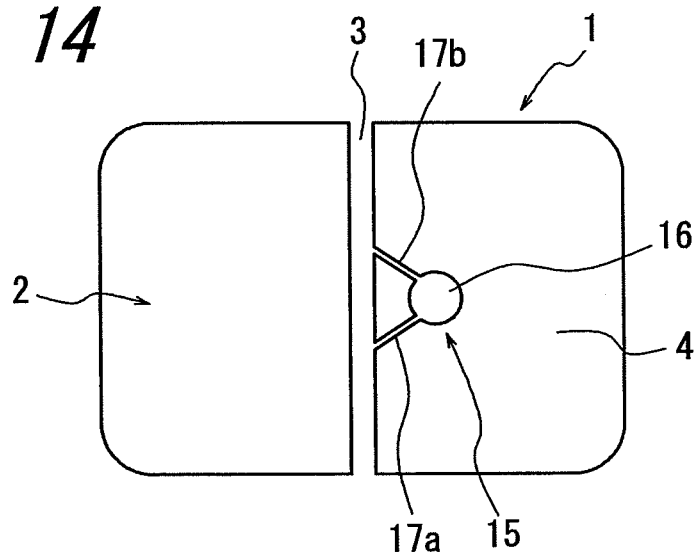
FIG. 14 is a schematic view showing a ground contact area of another embodiment.

FIG. 14 is a schematic view of a ground contact area similar to FIG. 1, which shows another embodiment of the present invention in the context of one resonator, and the similar parts to those described above are designated by the same reference numerals.

A resonator 15 functions in the same manner as the above described resonators 5, 5*b*, and 5*c*, and is configured with one air chamber 16 which is open toward a land portion surface, and two or more narrowed necks 17*a* and 17*b* are completely separated from each other which are separately open to a wall of the common circumferential groove 3 for communication between the air chamber 6 and the circumferential groove 3.

Figure 15:
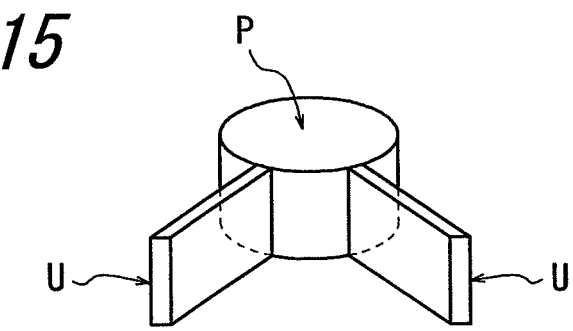
FIG. 15 is a perspective view illustrating a molding portion of a vulcanizing die for a resonator.

The resonator 15 having the above structure can be easily and securely formed by a vulcanization molding of a green tire using a vulcanizing die provided with a projection P which is protruded from a molding surface of the vulcanizing die for molding the air chamber 16, and two sipe blades U which are laterally projected from the peripheral surface of the projection P for molding the narrowed necks 17*a* and 17*b*, for example as illustrated in the perspective view of FIG. 15.

Figure 16:
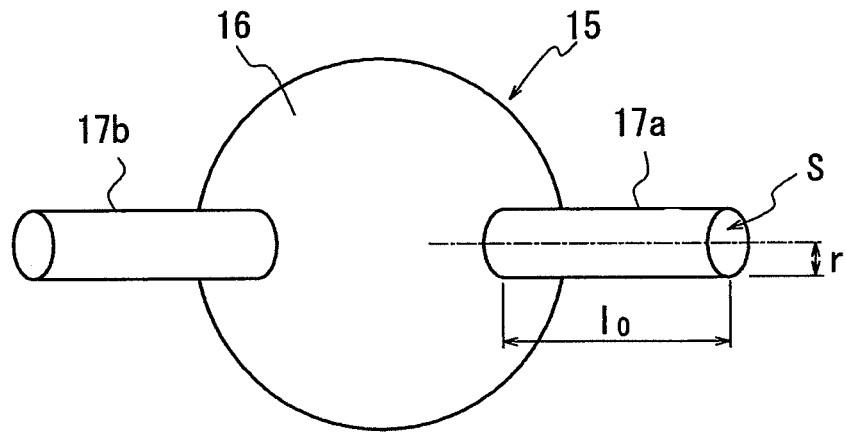
FIG. 16 is a perspective view showing the resonator shown in FIG. 14 resembling a Helmholtz type resonator.

The resonator 15 provides a Helmholtz type resonator as illustrated in FIG. 16 when the resonator 15 is provided in the ground contact area 2 of the tread 1 and the openings of the air chamber 16 and the narrowed necks 17*a* and 17*b* on a road surface side are closed by the road surface, and the resonator 16 has a resonance frequency $f_0$ which can be obtained from the following formula where the radius of both of the narrowed necks 17*a* and 17*b* is r, the total length of both of the narrowed necks 17*a* and 17*b* is $l_0$, the total cross sectional area of both of the narrowed necks 17*a* and 17*b* is S, the volume of air chamber is V, and the sound velocity is c:

$$f_0 = \frac{c}{2\pi}\sqrt{\frac{S}{(l_0 + 1.3r)\ V}} \qquad \text{[Formula 6]}$$

Therefore, the resonance frequency $f_0$ can be conveniently adjusted as required by selecting the radius r, the length $l_0$, the cross sectional area S, and the volume of air chamber V in relation to the resonant frequency of the air column of the circumferential groove 3, and for example, by setting the average of the resonance frequencies $f_0$ to be within a range of from 700 to 1800 Hz, a high frequency noise and the noise caused by air column resonance noise can be effectively reduced.

Figure 17:
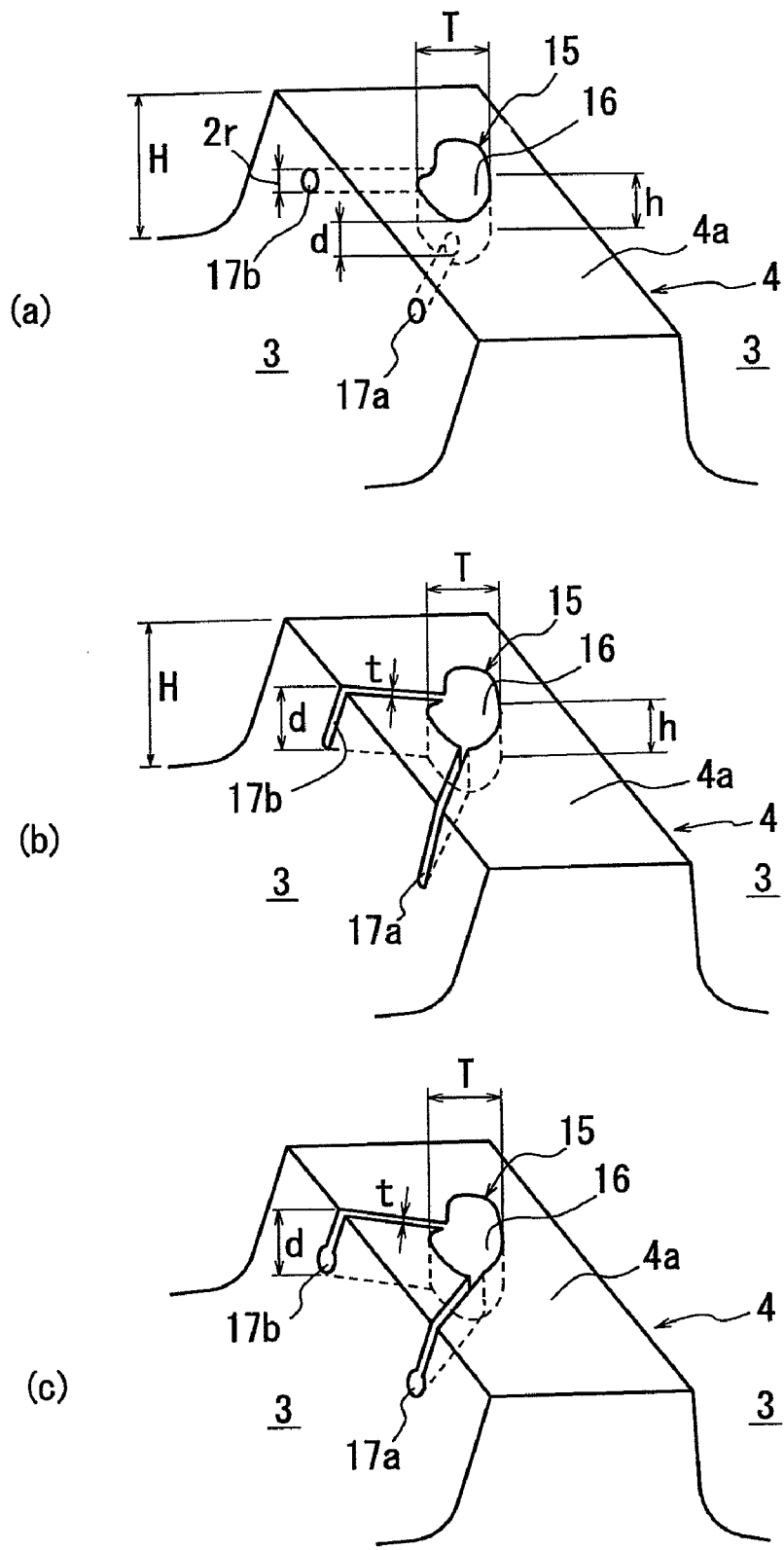
FIGS. 17(a) to (c) are main part perspective views illustrating a formation manner of a resonator.

In such resonator 15 also, the narrowed necks 17*a* and 17*b* may be the tunneled ones which are embedded in the land portion 4, a block 4*a* in the present embodiment as illustrated in the main part perspective view of FIG. 17(*a*), or as shown in FIG. 17(*b*), the ones which are open at a surface of the block 4*a*.

When the latter type narrowed necks 17*a* and 17*b* are formed by pressing in a sipe blade of a vulcanizing die or the like for example, the necks 17*a* and 17*b* in addition to the air chamber 16 can be easily formed.

In the case, the narrowed necks 17*a* and 17*b* can be formed with a sipe.

The sipe has a so-called flask-like shape with an enlarged space portion at the bottom thereof as illustrated in FIG. 17(*c*), and for example, and the portion other than the space portion which is so narrow that sipe walls contact with each other in a ground contact area, so that the narrowed necks 17*a* and 17*b* can have various dimensions which are constantly the same as those shown in FIG. 17(*a*).

In the resonator 15, more preferably, the air chamber 16 has a depth h from a land portion surface, a surface of the block 4*a* in FIG. 17, which is 20% or more, particularly 40 to 80% of the maximum depth H of the circumferential groove 3 defining the land portion 4, and preferably, the narrowed necks 17*a* and 17*b* have a depth dimension d from the block surface which is 70% or less, particularly 50% or less of the maximum depth h of the air chamber 16. And the narrowed necks 17*a* and 17*b* preferably have a width t which is 3 to 50%, particularly 3 to 20% of the width T of the air chamber 16.

Figure 18:
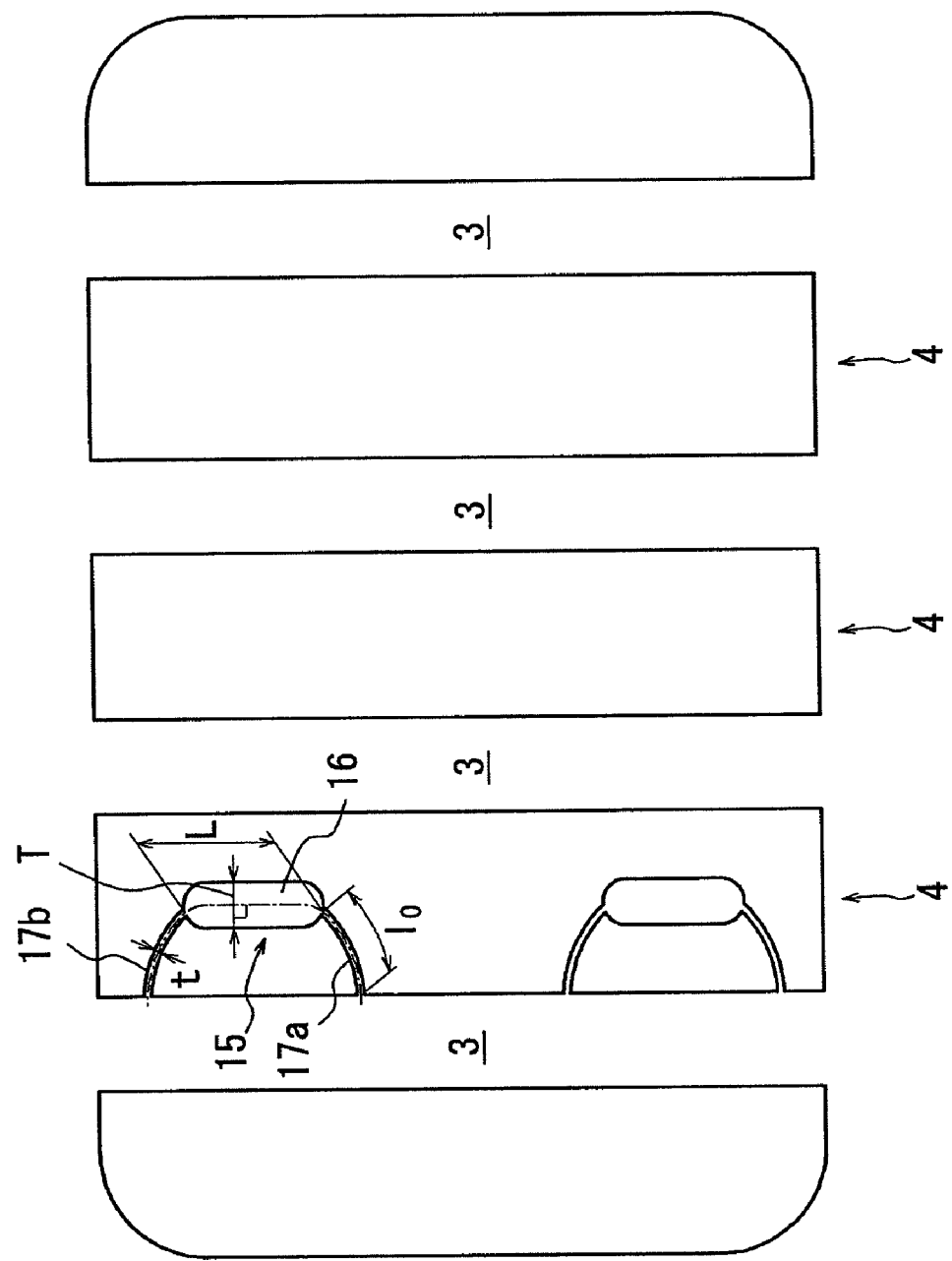
FIG. 18 is a view showing each dimension of a resonator.

In the present example, the length L of the air chamber 16 is the dimension along the line which passes the center of the width t of the narrowed necks 17*a* and 17*b* (the dimension along the axial direction), as illustrated in FIG. 18, and the dimension perpendicular to the length L is the width T of the air chamber 16.

In FIG. 14, the air chamber 16 has an opening toward a land portion surface of a circular shape, and the narrowed necks 17*a* and 17*b* are formed in a straight shape, and in FIG. 17, the air chamber 16 has an opening toward a block surface of an irregular contour shape with only curved line, but the opening of the air chamber 16 may have an oval or other curved contour shape, and also may have a square or other polygonal contour shape, and the narrowed necks 17*a* and 17*b* may be formed in a shape having a curved portion or bended portion.

Figure 19:
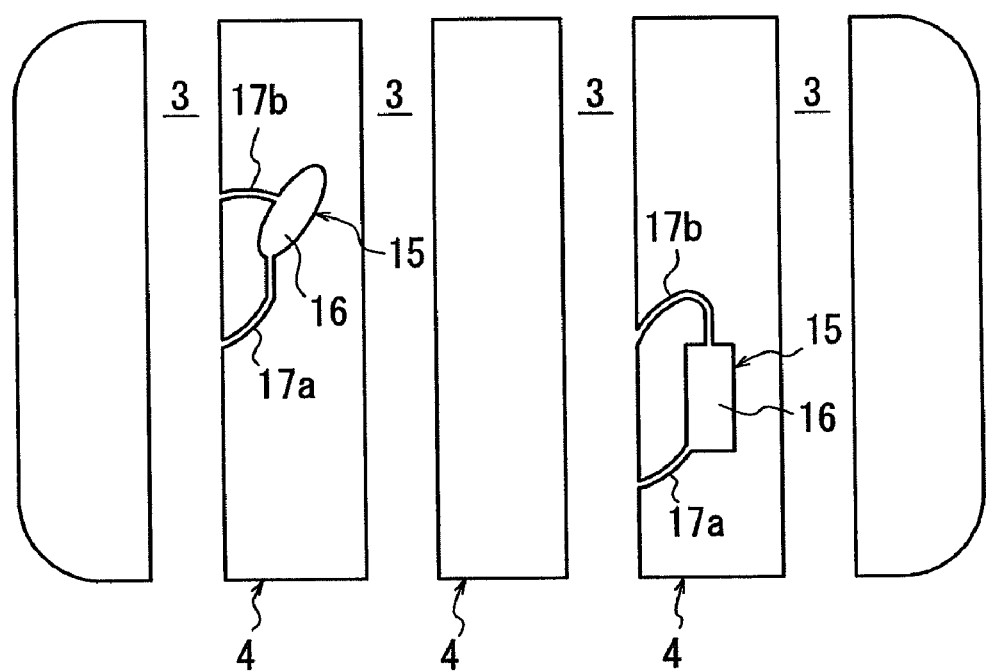
FIG. 19 is a view illustrating another form of a resonator.
Figure 20:
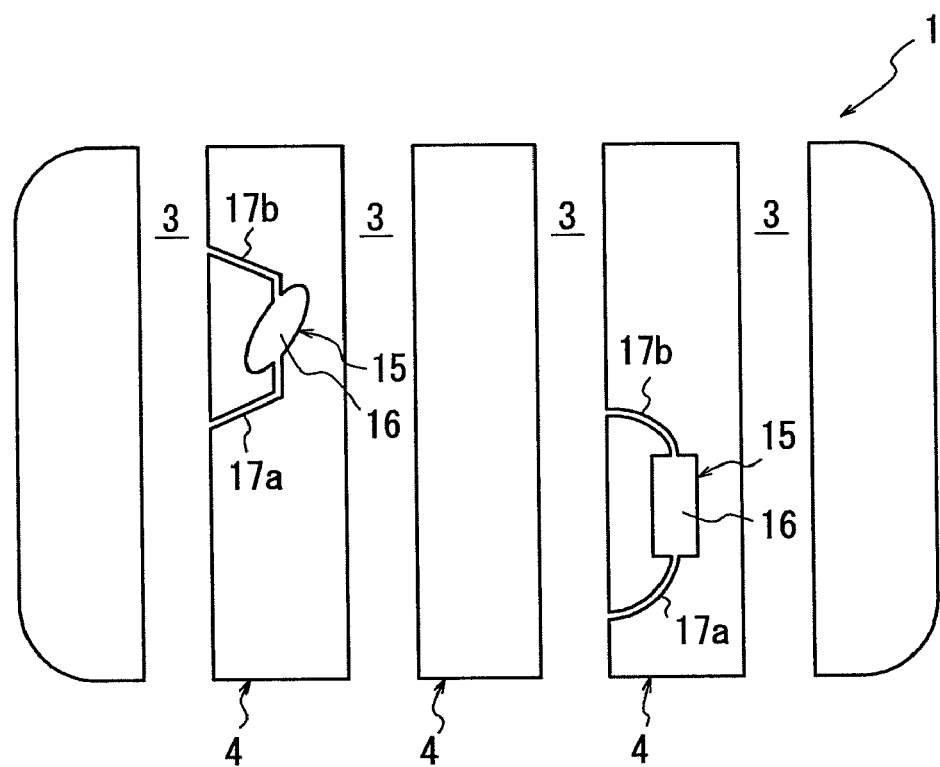
FIG. 20 is a view illustrating an arrangement manner of resonators.

Other examples of the opening shapes of the air chamber 16 and the narrowed necks 17*a* and 17*b* are shown in FIG. 19 and FIG. 20, respectively.

The air chamber 16 of the resonator 15 may have a bottom wall of a flat surface, or otherwise a convex surface or a concave surface toward the opening.

In the case, more preferably, as described for FIG. 6, the air chamber has a bottom surface having one or more upward projection 6*a* as convexity, so that the surface has the concavity and convexity difference 6 of 1.6 mm or more, more preferably 3.0 mm or more.

Figure 21:
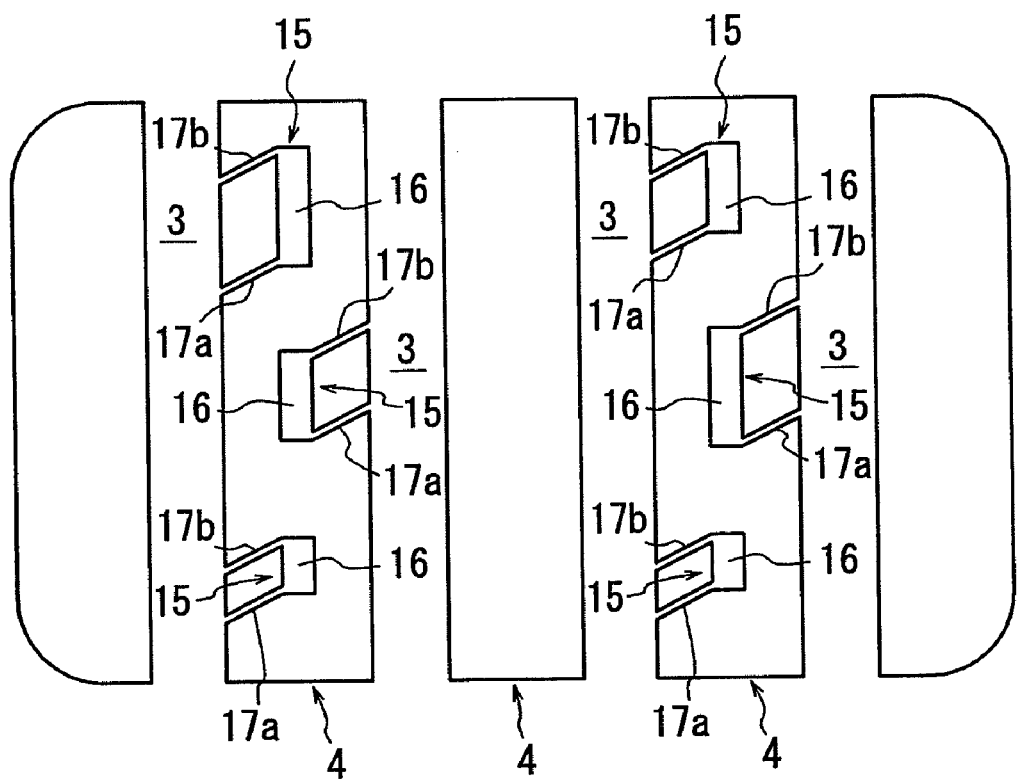
FIG. 21 is a view illustrating another arrangement manner of resonators.

The resonators 15 configured as described above are arranged relative to the circumferential groove 3 in a manner that, in both of the case where one circumferential groove 3 is formed in the tread 1 and the case where a plurality of circumferential grooves 3 are formed in the tread 1, at least one of the resonators 15 provided to any one of the circumferential groove(s) 3 is included in the ground contact area 2 under the conditions described above for FIG. 1, and more preferably, the plurality of resonators are arranged in a manner, as shown in FIG. 21, that those of the plurality of resonators 15 having different resonance frequencies are included at any moment in the ground contact area 2 which contacts the ground under the same conditions as those described above.

FIG. 21 shows that a plurality of resonators 15 having different resonance frequencies are arranged so that the resonators 15 provided to each of the circumferential grooves 3 extending in the ground contact area 2 are included in the ground contact area 2, but another arrangement is possible in which only a plurality of resonators 15 provided to at least one circumferential groove 3 among a plurality of circumferential grooves 3 are included in the ground contact area 2.

In the present embodiment, the air chamber 16 has an opening toward a land portion surface having an area within a range of from 25 to 300 mm², more preferably 72 to 180 mm.

This is because the range allows the air chamber 16 to effectively fulfill its original function, and also the range effectively limits the increase of the collision noise of the opening edge of the air chamber with road surface, while the opening having an area of less than 25 mm² hardly allows the air chamber 16 to sufficiently fulfill the function as a resonance chamber even when the air chamber is deeper to secure a required volume, and inconveniently requires a longer narrowed neck for adjustment of frequency, and the opening having an area of over 300 mm² inevitably increases the collision noise with road surface which is caused by a longer opening edge.

In the present embodiment, preferably, the air chamber 16 has the maximum depth h from a land portion surface which is 20% or more, particularly 40 to 80% of the maximum depth H of the circumferential groove 3 defining the land portion 4 in the tread surface, so that the air chamber 16 is provided with a sufficient land portion opening area and its volume to effectively fulfill the function as a resonance chamber.

In other words, the average depth h which is less than 20% may not sufficiently excite the air resonance, while the average depth h over 80% may increase the collision noise of the air chamber opening edge with road surface, that is, pitch noise.

The narrowed necks 17a and 17b have a width t (the total widths when one air chamber has a plurality of narrowed necks) which is limited to be within a range of from 3 to 50% of the width T of the air chamber 16, as seen in a two-dimensional pattern, and this is because the narrowed necks 17a and 17b and the air chamber 16 have to have different widths from each other in order to fulfill individual functions, and when the narrowed necks 17a and 17b have the width t which is less than 3% of the width T of the air chamber 16, the resonance effect cannot be observed as expected when the narrowed necks 17a and 17b are closed, while with the width t over 50% of the width T, the resonance effect is reduced because the narrowed necks 17a and 17b function more as tubes.

Thus, the width t is set to be within a range of from 3 to 20% of the width T so as to cause the resonator 15 to effectively fulfill its function.

When the narrowed necks 17a and 17b are those of sipe type, a so-called flask-shaped sipe having an enlarge space portion at the bottom thereof is applicable.

In the case, the resonator for a resonance frequency $f_0$ has a neck having a diameter 2 r which can be obtained by the back calculation of the radius r using the cross sectional area of the sipe.

As described above, the narrowed necks 17a and 17b of the resonator 15 may be those of a tunnel type which are not exposed to the surface of the land portion 4, but when the narrowed necks 17a and 17b are those of the sipe type open at a land portion surface, the manufacturing of the resonator 15, eventually the tire, can be further facilitated, and also the sipe having a sufficient depth allows the resonator 15 to effectively function at all times by preventing an early elimination of the narrowed necks even when the tread is progressively worn.

The air chamber has dimensions which are set using the total cross sectional areas of the narrowed necks 17a and 17b and the average length of the narrowed necks 17a and 17b.

The very shallow narrowed necks 17a and 17b are eliminated soon as the necks are worn, while the very deep necks makes the narrowed necks 17a and 17b which may be sipes opened/closed easily, which considerably changes the cross sectional areas of the necks and makes the determination of the resonance frequencies $f_0$ difficult, as the result of that the resonator 15 may not function as intended. Therefore, the depth of the narrowed necks 17a and 17b should be set in consideration with the above problems.

The frequencies of the resonators 15 can be determined by tuning by finite element method, boundary element method, or the like.

The air column resonance noise at the circumferential groove 3 is reduced as the volume of the circumferential groove is reduced by wearing, thereby the narrowed necks 17a and 17b is initially set to have a depth d which is 70% or less, preferably 50% or less of the maximum depth h of the air chamber 16.

EXAMPLE 8

A tire which had a ground contact area as shown in FIG. 21 (size: 195/65R15, with four circumferential grooves having a width of 8 mm and a depth of 8 mm, and a pitch length by pitch variation of 50 mm) and is mounted to a 6JJ rim and inflated with an air pressure of 210 kPa is rotated at a speed of 80 km/h with a load of 4.47 kN applied thereto using an indoor drum tester, and the sound on both sides of the tire is measured according to the condition specified in JASO C606 to obtain partial overall values in a 1/3 octave band with center frequencies of 800 Hz, 1000 Hz, and 1250 Hz.

In the case, the result of a reduction of sound pressure by 2 dB or more is determined to be effective because the amount of reduction can be expected to improve the feeling evaluation by a driver in a real car test.

The resonator had a resonance frequency $f_0$ which can be obtained by the following formula as described above:

$$f_0 = \frac{c}{2\pi}\sqrt{\frac{S}{(l_0 + 1.3r)\,V}} \quad \text{[Formula 7]}$$

$$f_0 = \frac{c}{2\pi}\sqrt{\frac{2(S_1 + S_2)}{\{(l_{01} + 1.3r_1) + (l_{02} + 1.3r_2)\}\,V}}$$

In the present example, the sound velocity c is 343.7 m/s.

The measured result with a conventional tire having one straight circumferential groove extending in a ground contact area, and the measured result of the Example tire which had one straight circumferential groove extending in a ground contact area and three types of resonators with different resonance frequencies arranged in the manner shown in FIG. 17(b) and open at the groove, with the resonators being configured to have the air chambers volumes V of 864 mm³, 1123 mm³, and 605 mm³, respectively, and a narrowed neck having a cross sectional areas S of 1 mm² and a radius r of 0.56 mm so that the resonators had the different resonance frequencies of 1014 Hz, 889 Hz, and 1212 Hz respectively and the air chamber is open toward a land portion surface, were compared.

As a result, in the Example tire, the generated noise in 1000 Hz frequency band is reduced by 2.6 dB. Each air chamber had the following dimensions: a width T of air chamber: 6 mm, a length L of air chamber: 24 mm, 31.2 mm, and 16.8 mm, respectively, the maximum depth H of air chamber: 6 mm, a depth d of narrowed neck: 2 mm, and a width t of narrowed neck: 0.5 mm (the dimensions of narrowed neck represents those of one neck).

EXAMPLE 9

The noise level difference between the Example tire which is provided with resonators having various operation frequencies within a range of from 600 to 2000 Hz as shown in Table 3 and a conventional tire (which had four straight grooves having a width of 8 mm and a depth of 8 mm) is measured under the same conditions as those in Example 8. The results are shown in FIG. 22.

TABLE 3

| SPEC | Average of Operation Frequencies of Resonators[Hz] | Effect [dB] | Width of Air Chamber [mm] | Length of Air Chamber [mm] | Depth of Air Chamber [mm] | Length of Neck [mm] | Depth of Neck [mm] | Width of Neck [mm] | Operation Frequency [Hz] |
|---|---|---|---|---|---|---|---|---|---|
| A | 626 | 1.8 | 6 | 8.4 | 6 | 18 | 1 | 0.5 | 731 |
|   |     |     | 6 | 12   | 6 | 18 | 1 | 0.5 | 612 |
|   |     |     | 6 | 15.6 | 6 | 18 | 1 | 0.5 | 536 |
| B | 711 | 2.5 | 6.5 | 8.4 | 7 | 22 | 2 | 0.5 | 830 |
|   |     |     | 6.5 | 12 | 7 | 22 | 2 | 0.5 | 694 |
|   |     |     | 6.5 | 15.6 | 7 | 22 | 2 | 0.5 | 609 |
| C | 838 | 2.6 | 7 | 8.4 | 6 | 17 | 2 | 0.5 | 978 |
|   |     |     | 7 | 12 | 6 | 17 | 2 | 0.5 | 818 |
|   |     |     | 7 | 15.6 | 6 | 17 | 2 | 0.5 | 718 |
| D | 903 | 2.8 | 8 | 8.4 | 6.5 | 14 | 2 | 0.6 | 1054 |
|   |     |     | 8 | 12 | 6.5 | 14 | 2 | 0.6 | 882 |
|   |     |     | 8 | 15.6 | 6.5 | 14 | 2 | 0.6 | 773 |
| E | 1038 | 3.2 | 8 | 8.4 | 6.5 | 14 | 2 | 0.8 | 1212 |
|   |     |     | 8 | 12 | 6.5 | 14 | 2 | 0.8 | 1014 |
|   |     |     | 8 | 15.6 | 6.5 | 14 | 2 | 0.8 | 889 |
| F | 1280 | 3.1 | 7 | 8.4 | 6.5 | 13 | 2 | 1 | 1494 |
|   |     |     | 7 | 12 | 6.5 | 13 | 2 | 1 | 1250 |
|   |     |     | 7 | 15.6 | 6.5 | 13 | 2 | 1 | 1096 |
| G | 1378 | 2.8 | 6.5 | 8.4 | 6.5 | 12 | 2 | 1 | 1608 |
|   |     |     | 6.5 | 12 | 6.5 | 12 | 2 | 1 | 1346 |
|   |     |     | 6.5 | 15.6 | 6.5 | 12 | 2 | 1 | 1180 |
| H | 1434 | 2.5 | 6.5 | 8.4 | 6 | 12 | 2 | 1 | 1674 |
|   |     |     | 6.5 | 12 | 6 | 12 | 2 | 1 | 1401 |
|   |     |     | 6.5 | 15.6 | 6 | 12 | 2 | 1 | 1228 |
| I | 1595 | 2.3 | 7 | 8.4 | 6.5 | 8 | 2 | 1 | 1862 |
|   |     |     | 7 | 12 | 6.5 | 8 | 2 | 1 | 1557 |
|   |     |     | 7 | 15.6 | 6.5 | 8 | 2 | 1 | 1366 |
| J | 1670 | 2.1 | 8 | 9.8 | 6.5 | 8 | 2 | 1.5 | 1950 |
|   |     |     | 8 | 14 | 6.5 | 8 | 2 | 1.5 | 1631 |
|   |     |     | 8 | 18.2 | 6.5 | 8 | 2 | 1.5 | 1431 |
| K | 1863 | 2 | 7.5 | 9.1 | 6 | 8 | 2 | 1.5 | 2175 |
|   |     |   | 7.5 | 13 | 6 | 8 | 2 | 1.5 | 1820 |
|   |     |   | 7.5 | 16.9 | 6 | 8 | 2 | 1.5 | 1596 |
| L | 2129 | 1.6 | 7.5 | 9.1 | 6 | 8 | 2 | 2 | 2485 |
|   |     |     | 7.5 | 13 | 6 | 8 | 2 | 2 | 2079 |
|   |     |     | 7.5 | 16.9 | 6 | 8 | 2 | 2 | 1823 |

Figure 22:
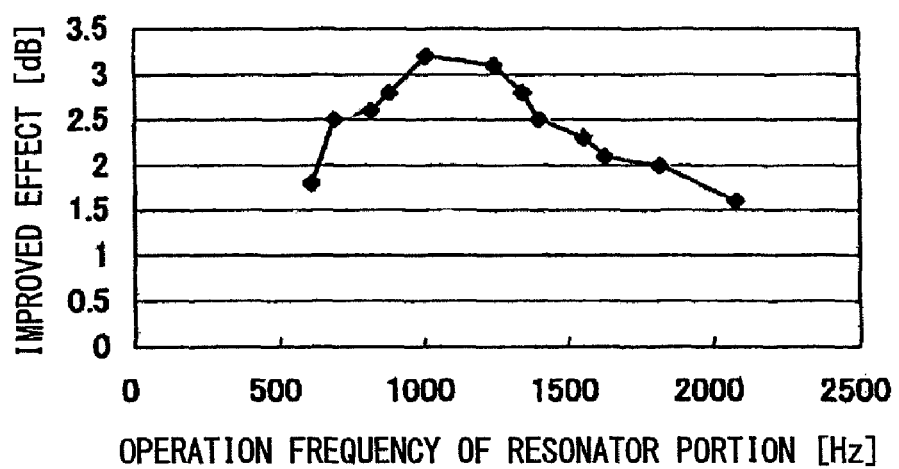
FIG. 22 is a graph showing the results of Example 9.

FIG. 22 clearly shows that the resonators set to have operation frequencies the average of which is within a range of from 700 to 1800 Hz are effective, and particularly with the average within a range about from 700 to 1400 Hz, the noise level is significantly improved as compared with that of the conventional tire.

EXAMPLE 10

The Example tires (under the same conditions as those in Example 8) provided with resonators which had operation frequencies within a range of from 600 to 2000 Hz were prepared and mounted to a vehicle for a driving experiment at a test course (driving conditions: rim 6JJ, passenger vehicle (Sedan), driving on a straight blacktop road at 80 km/h), to evaluate the noise feeling of a driver (the +3 points is set to be the desired level as a generally acceptable level difference). The results are shown in Table 4.

TABLE 4

| SPEC | Average of Set Frequencies of Resonators (Hz) | Effect (points) | Note |
|---|---|---|---|
| A | 626 | +2 | |
| B | 711 | +3 | Effective in reducing air column resonance noise |
| C | 838 | +4 | |
| E | 1038 | +4 | |

TABLE 4-continued

| SPEC | Average of Set Frequencies of Resonators (Hz) | Effect (points) | Note |
|---|---|---|---|
| G | 1378 | +3 | |
| I | 1595 | +3 | Effective in reducing high frequency noise |
| K | 1863 | +3 | |
| L | 2129 | +2 | |

As clearly seen from Table 4, it is confirmed that the three types of resonators having set frequencies the average of which is within a range of about from 700 to 1800 Hz are effective in reducing the air column resonance noise as well as high frequency noise caused by various factors.

EXAMPLE 11

A comparison about the effect of noise reduction is made between a tire having a ground contact area as shown in FIG. 21 with a narrowed neck of the shape as shown in FIG. 17(b) (having the total sectional area S of 2 mm$^2$) and the air chambers having volumes V of 864 mm$^3$, 1123 mm$^3$, and 605 mm$^3$ and a tire having resonators which individually have only one narrowed neck in FIG. 21 (The narrowed neck has a broader cross sectional area equal to the sectional area S. Not shown.), and a conventional tire having four straight circumferential grooves (straight rib pattern), by performing a test under the same conditions as those in Example 8.

The three types of resonators had the following dimensions: a width of air chamber T: 6 mm, a length of air chamber L: 24 mm, 31.2 mm, and 16.8 mm respectively, a depth of air chamber H: 6 mm, a depth of narrowed neck d: 2 mm, and a width of narrowed neck t: 0.5 mm (the dimensions of narrowed neck represents those of one neck).

As a result, it is found that the tire with a single narrowed neck reduced the noise in partial overall values in a 1/3 octave band with center frequencies of 800 Hz, 1000 Hz, and 1250 Hz by 2.6 dB, but that the Example tire with two narrowed necks reduces the noise by 2.8 dB which increased the reduction effect.

EXAMPLE 12

The tire having resonators configured as shown in FIG. 17(a) is used, in which the operation frequencies of the resonators were set to have an average at about 1000 Hz and the widths of the air chambers and the widths of the narrowed neck were changed as shown in Table 5, so that the influences caused by the tire on the effect of noise reduction were examined (the test conditions were the same as those in Example 8).

Figure 23:
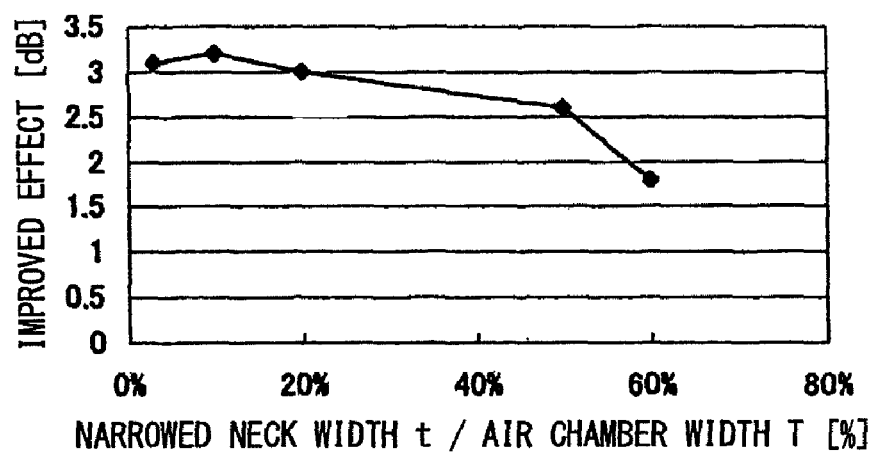
FIG. 23 is a graph showing the results of Example 12.

The results are shown in FIG. 23 as the noise level differences from those of a conventional tire (with four straight circumferential grooves having a width of 8 mm and a depth of 8 mm).

TABLE 5

| Width of Neck/Width of Air Chamber [%] | Effect [dB] | Width of Air Chamber [mm] | Length of Air Chamber [mm] | Depth of Air Chamber [mm] | Length of Neck [mm] | Depth of Neck [mm] | Width of Neck [mm] | Operation Frequency [Hz] |
|---|---|---|---|---|---|---|---|---|
| 3 | 3.1 | 10 | 4.2 | 7 | 16 | 4 | 0.3 | 1206 |
|   |     | 10 | 6   | 7 | 16 | 4 | 0.3 | 1009 |
|   |     | 10 | 7.8 | 7 | 16 | 4 | 0.3 | 885 |
| 10 | 3.2 | 5 | 8.4 | 6 | 12 | 1.5 | 0.5 | 1187 |
|    |     | 5 | 12  | 6 | 12 | 1.5 | 0.5 | 993 |
|    |     | 5 | 15.6 | 6 | 12 | 1.5 | 0.5 | 871 |
| 20 | 3 | 5 | 14 | 6 | 19 | 2 | 1 | 1193 |
|    |   | 5 | 20 | 6 | 19 | 2 | 1 | 998 |
|    |   | 5 | 26 | 6 | 19 | 2 | 1 | 875 |
| 50 | 2.6 | 4 | 14 | 7 | 30 | 1.5 | 2 | 1210 |
|    |     | 4 | 20 | 7 | 30 | 1.5 | 2 | 1013 |
|    |     | 4 | 26 | 7 | 30 | 1.5 | 2 | 888 |
| 60 | 1.8 | 5 | 17.5 | 6.8 | 30 | 1.5 | 3 | 1198 |
|    |     | 5 | 25   | 6.8 | 30 | 1.5 | 3 | 1002 |
|    |     | 5 | 32.5 | 6.8 | 30 | 1.5 | 3 | 879 |

As clearly seen from FIG. 23, the results confirmed that the effect of noise reduction is likely to be considerably improved when the narrowed neck had a width within a range of about 3 to 50% of the width of the air chamber.

EXAMPLE 13

The tire having resonators shown in FIG. 17(a) is used in which the operation frequencies of the resonators were set to have an average at about 1000 Hz and the maximum depths of the air chambers and the depths of the narrowed neck were changed as shown in Table 6, so that the influences caused by the tire on the effect of noise reduction were examined (the test conditions were the same as those in Example 8).

Figure 24:
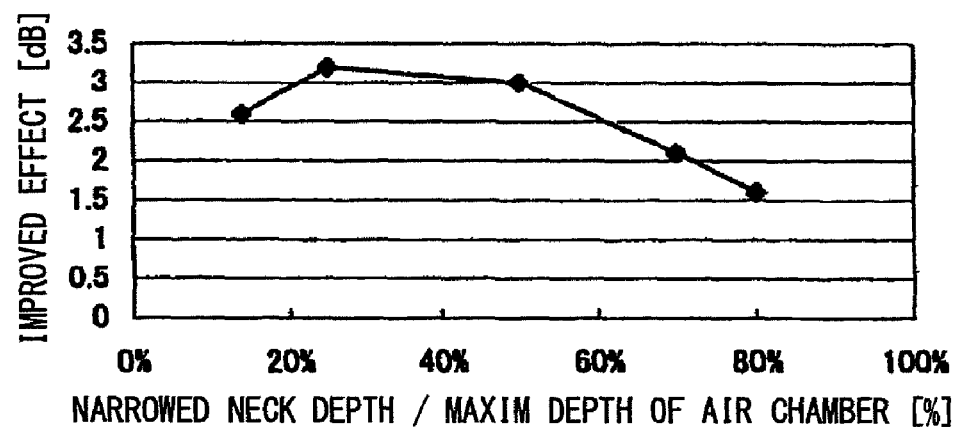
FIG. 24 is a graph showing the results of Example 13.

The results are shown in FIG. 24 as the noise level differences from those of a conventional tire (with four straight circumferential grooves having a width of 8 mm and a depth of 8 mm).

TABLE 6

| Depth of Neck/Depth of Air Chamber [%] | Effect [dB] | Width of Air Chamber [mm] | Length of Air Chamber [mm] | Depth of Air Chamber [mm] | Length of Neck [mm] | Depth of Neck [mm] | Width of Neck [mm] | Operation Frequency [Hz] |
|---|---|---|---|---|---|---|---|---|
| 14 | 2.6 | 6 | 10.5 | 7.2 | 17 | 1 | 2 | 1210 |
|    |     | 6 | 15   | 7.2 | 17 | 1 | 2 | 1012 |
|    |     | 6 | 19.5 | 7.2 | 17 | 1 | 2 | 888 |

TABLE 6-continued

| Depth of Neck/Depth of Air Chamber [%] | Effect [dB] | Width of Air Chamber [mm] | Length of Air Chamber [mm] | Depth of Air Chamber [mm] | Length of Neck [mm] | Depth of Neck [mm] | Width of Neck [mm] | Operation Frequency [Hz] |
|---|---|---|---|---|---|---|---|---|
| 25 | 3.2 | 5 | 8.4 | 6 | 12 | 1.5 | 0.5 | 1187 |
|  |  | 5 | 12 | 6 | 12 | 1.5 | 0.5 | 993 |
|  |  | 5 | 15.6 | 6 | 12 | 1.5 | 0.5 | 871 |
| 50 | 3 | 6.5 | 15.4 | 4 | 20 | 2 | 1 | 1192 |
|  |  | 6.5 | 22 | 4 | 20 | 2 | 1 | 997 |
|  |  | 6.5 | 28.6 | 4 | 20 | 2 | 1 | 875 |
| 70 | 2.1 | 6 | 15.4 | 4 | 15 | 2.8 | 0.5 | 1195 |
|  |  | 6 | 22 | 4 | 15 | 2.8 | 0.5 | 1000 |
|  |  | 6 | 28.6 | 4 | 15 | 2.8 | 0.5 | 877 |
| 80 | 1.6 | 8 | 8.4 | 5 | 14 | 4 | 0.3 | 1202 |
|  |  | 8 | 12 | 5 | 14 | 4 | 0.3 | 1005 |
|  |  | 8 | 15.6 | 5 | 14 | 4 | 0.3 | 882 |

As clearly seen from FIG. 24, the results confirmed that the effect of noise reduction is likely to be considerably improved when the narrowed neck had a depth within a range up to about 70% of the maximum depth of the air chamber, and that the effect of noise reduction is particularly obvious when the narrowed neck has a depth within a range of 50% or less of the maximum depth of the air chamber.

EXAMPLE 14

The tire having air chambers (with the opening areas of 144 mm$^2$, 101 mm$^2$, and 187.2 mm$^2$, the volumes V of 864 mm$^3$, 1123 mm$^3$, and 605 mm$^3$, and all of the maximum depths of 6 mm) which were open as shown in FIG. 21 and had an uneven structure (level difference) as shown in Table 7 at the bottom walls thereof is used to examine the occurrence of stone trapping by a performing a driving experiment (the test conditions were the same as those in Example 8).

Figure 25:
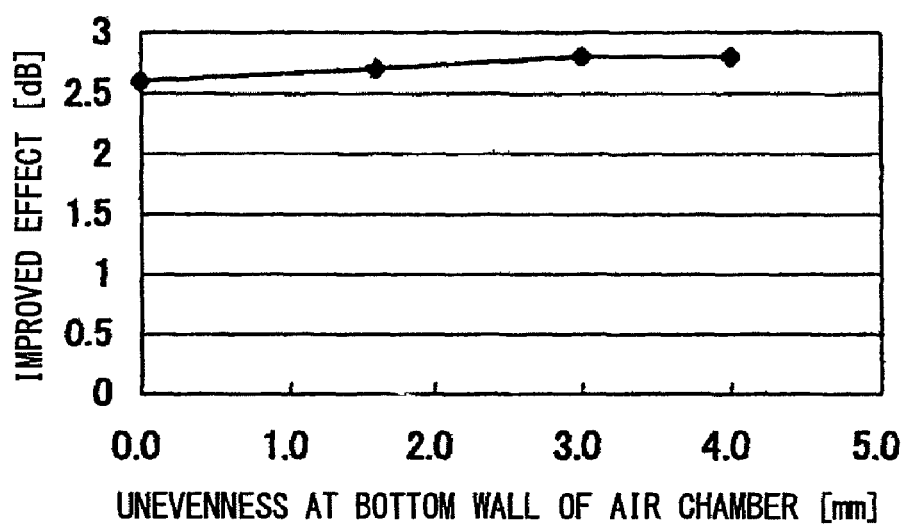
FIG. 25 is a graph showing the results of Example 14.

As a result, as shown in Table 7 together, no stone trapping is observed in the cases with the unevenness (level difference) of 1.6 mm, 3 mm, and 5 mm at the bottom walls of the air chambers, and it is confirmed that the noise level remained high as shown in FIG. 25.

TABLE 7

| Unevenness (concavity and convexity) at Bottom Wall of Air Chamber [mm] | Presence/Absence of Stone Trapping | Effect [dB] |
|---|---|---|
| 0 | Presence | 2.6 |
| 1.6 | Absence | 2.7 |
| 3 | Absence | 2.8 |
| 5 | Absence | 2.8 |

EXAMPLE 15

As for the tires having the ground contact area shown in FIG. 21, the noise levels of the tires of the straight rib pattern (having the same number of resonator for one pitch) were compared (under the same conditions as those in Example 8) between a comparative tire in which three types of resonators (with operation frequencies: 1014 mm Hz, 890 Hz, and 1212 Hz) were arranged to every other pitch on a half circumference of the tire (no resonator is included in the ground contact area while the tire being rolled) and the Example tire in which the resonators were arranged to every other pitch on the entire circumference of the tire (one resonator is constantly included in the ground contact area while the tire being rolled), to find that the effect of the comparative tire is the reduction by 1.5 dB, while the effect of the Example tire is the larger reduction by 2.7 dB, and that in the Example tire particularly, the constant existence of resonator in the ground contact area of the tire (with a ground contact length of about 140 mm) is effective.

As a result, the noise level difference is about 1.5 dB in the comparative tire in which the resonator is not constantly included in the ground contact area, while the noise level difference is about 2.7 dB in the Example tire in which one resonator is constantly included in the ground contact area, which showed that the tire according to the present invention provides a higher effect of noise reduction.

EXAMPLE 16

The Example tires as shown in FIG. 21 in which a set of resonators having the averages of operation frequencies shown in Table 8 were constantly included in the ground contact area were used for a driving test (under the same conditions as those in Example 8), to examine the noise level difference from a tire having a straight rib pattern.

TABLE 8

| Width of Air Chamber T [mm] | Length of Air Chamber L [mm] | Depth of Air Chamber h [mm] | Length of Narrowed Neck $l_0$ [mm] | Depth of Narrowed Neck d [mm] | Width of Narrowed Neck t [mm] | Average of Operation Frequencies [Hz] |
|---|---|---|---|---|---|---|
| 6 | 36 | 4 | 6 | 2 | 0.5 | 1014 |
| 4 | 36 | 4 | 6 | 2 | 0.5 | 1242 |
| 6 | 36 | 6.5 | 6 | 2 | 0.5 | 796 |

As a result, the noise level difference is found to be about 3.3 dB, which showed that when the three types of resonators having different operation frequencies are provided in the surface, the resonators are able to operate at the same time for a broad band, which provides a large effect of noise reduction in total. This can be considered to be due to the characteristics of the air column resonance noise having broad peaks in frequency space.

In further another embodiment of the present invention, any one of the above described tires, for example the one shown in FIG. 1, includes the resonator 5 having the air chamber 6 open at the surface of the land portion 4 and the narrowed neck 7 which can be embedded in the land portion 4 for communication between the air chamber 6 and the circumferential groove 3, and the air chamber 6 of the resonator 5 has an opening area within a range of from 25 to 300 mm$^2$, more preferably, 100 to 150 mm toward the land portion surface in a state that no load is applied to the tire.

In the embodiment also, the air chamber 6 have a cross-sectional area and a contour shape in a cross section parallel to the land portion surface which may be the same as those of the opening at the land portion toward the bottom wall of the air chamber 6, or may be gradually increased or on the contrary, gradually decreased as far as the die portion can be removed from the air chamber 6 of the tire after vulcanization molding without any restraint.

The resonator 5 configured as described above is able to function as a Helmholtz type resonator explained above in connection with FIG. 3, and has the resonance frequency $f_0$ similar to that in the above explanation which can be obtained by the following formula:

$$f_0 = \frac{c}{2\pi} \sqrt{\frac{S}{(l_0 + 1.3r)\,V}} \quad \text{[Formula 8]}$$

Therefore, the resonance frequency $f_0$ can be also conveniently adjusted as required by selecting a neck radius r, a neck length $l_0$, a sectional area of neck S, and a volume of air chamber V in relation to the resonant frequency of the air column of the circumferential groove 3, and preferably, the average of the resonance frequencies $f_0$ is set to be within a range of from 700 to 1800 Hz, more preferably within a range of from 700 to 1400 Hz.

FIG. 1 shows that the air chamber 6 has an opening toward a land portion surface of an circular shape, but the opening may have an oval or other curved contour shape, and also may have a square or other polygonal contour shape.

In such a resonator 5, as described above for FIG. 5, the narrowed neck 7 may be, as illustrated in FIG. 5(a), the tunnel-shape one which is embedded in the block 4a, or as shown in FIG. 5(b), the one which is open at a surface of the block 4a, and when the latter type open neck 7 is formed by pressing in a vulcanizing die blade or the like for example, the narrowed neck 7 in addition to the air chamber 6 can be easily formed.

In the case, the narrowed neck 7 can be formed with a sipe.

The sipe has a so-called flask-like shape with an enlarged space portion at the bottom thereof as illustrated in FIG. 5(c), and for example, the portion other than the space portion which is so narrow that sipe walls contact with each other in a ground contact area, so that the narrowed neck 7 can have various dimensions which are constantly the same as those shown in FIG. 5(a).

In the resonator 5, more preferably, the air chamber 6 has the maximum depth h from the land portion surface, from a block surface in the figure, which is within a range of 20% or more, particularly from 40 to 80% of the maximum depth H of a groove, for example the circumferential groove 3 which defines the land portion, the block 4a in the figure, in the tread 1, and preferably, the narrowed neck 7 has a depth dimension d from the block surface which is within a range of 70% or less, particularly 50% or less of the maximum depth h of the air chamber 6.

FIG. 5 shows that the air chamber 6 has an opening toward a block surface of an irregular contour shape with only curved line.

In the above description, the air chamber 6 may have a bottom wall of a flat surface, a convex surface, or a concave surface toward the opening as described above for FIG. 6, and in the case, more preferably, the air chamber has a bottom surface having one or more upward projection 6a as convexity, so that the surface has the concavity and convexity difference 6 of 1.6 mm or more, more preferably 3.0 mm or more.

The projection 6a in the case may be formed on a wall of the air chamber to be independent of the bottom wall, in other words, separate from the bottom wall.

The resonator 5 configured as described above should be arranged to the circumferential groove 3 in a manner, for example as shown in FIG. 1, in which a plurality of resonators 5 having different resonance frequencies are completely included in the ground contact area 2 under the conditions described for FIG. 1, at any moment in both of the case where one circumferential groove 3 is formed in the tread 1 and the case where a plurality of circumferential grooves 3 are formed in the tread 1.

In the cases, as illustrated in FIG. 4, preferably the plurality of resonators 5a, 5b, and 5c having different resonance frequencies are arranged to each circumferential groove 3 in a manner so that each of the resonators 5a, 5b, and 5c are included at any moment in the ground contact area 2 which contacts ground under the same conditions as those described above.

Thus, without being limited to the manner shown in FIG. 4, the resonators 5a, 5b, and 5c may be arranged in a manner so that the plurality of resonators provided to at least one circumferential groove 3 among a plurality of circumferential grooves 3 are included in the ground contact areas.

EXAMPLE 17

A tire (size: 195/65R15) mounted to a 6JJ rim and inflated with an air pressure of 210 kPa is rotated at a speed of 80 km/h with a load of 4.47 kN applied thereto using an indoor drum tester, and the sound on both sides of the tire is measured according to the condition specified in JASO C606 to obtain partial overall values in a 1/3 octave band with center frequencies of 800 Hz, 1000 Hz, and 1250 Hz.

In the case, the result of a reduction of sound pressure by 2 dB or more is determined to be effective because the amount of reduction can be expected to improve the feeling evaluation by a driver in a real car test.

The resonator had a resonance frequency $f_0$ which can be obtained by the following formula as described above:

$$f_0 = \frac{c}{2\pi} \sqrt{\frac{S}{(l_0 + 1.3r)\,V}} \quad \text{[Formula 9]}$$

In the present example, the sound velocity c is 343.7 m/s.

The measured result with a conventional tire having a ground contact area with four straight circumferential grooves extending therein, and the measured result with the Example tire having sixty resonators arranged in the manner shown in FIG. 7(b) to each of four straight circumferential grooves extending in a ground contact area, the resonators having a form as shown in FIG. 7(a) with an air chamber which has a rectangular opening at a land portion surface, and the three types of resonators having the volumes of air chambers V of 302 mm³, 432 mm³, and 562 mm³, a sectional area of neck S of 1 mm², a radius of neck r of 0.56 mm, and a resonance frequency of 1014 Hz, were compared, to find the reductions of the above partial overall values with center frequencies of 800 Hz, 1000 Hz, and 1250 Hz by 2.6 dB in the Example tire 1.

EXAMPLE 18

The differences of the partial overall values in a 1/3 octave band with center frequencies of 800 Hz, 1000 Hz, and 1250 Hz between the Example tire having a pitch length of 38.5 mm based on the open area to a land portion of the air chambers of three types of resonators which resonate at about 900 Hz, about 1000 Hz, and about 1200 Hz as a parameter and the above described conventional tire were obtained under the same conditions as those in Example 1.

Figure 26:
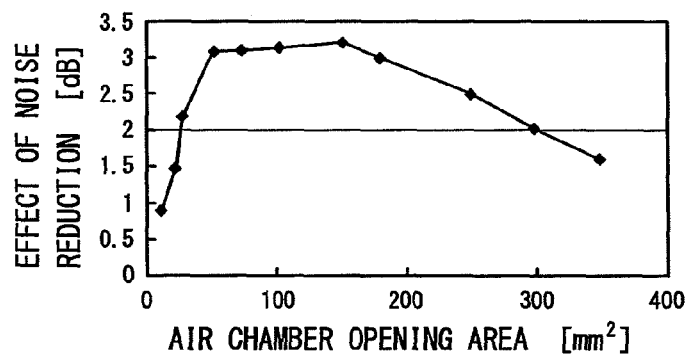
FIG. 26 is a view showing the results of Example 18.

The effect of noise reduction in the Example tire is shown in FIG. 26.

According to FIG. 26, the results show that the opening areas of the air chamber within a range of from 25 to 300 mm² provide a noise reduction by 2 dB or more, and that particularly the effect is obvious within a range of from 72 to 180 mm².

EXAMPLE 19

The difference of noise level between the Example tire in which the resonance frequencies $f_0$ of three types of resonators were varied and the conventional tire were measured as in the case of Example 1.

Figure 27:
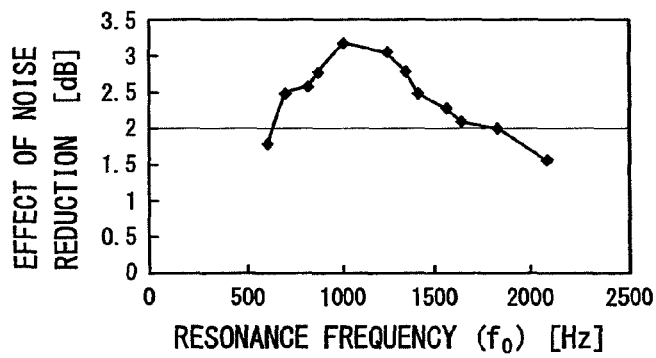
FIG. 27 is a view showing the results of Example 19.

The effect of noise reduction by the Example tire is shown in FIG. 27.

According to FIG. 27, the results clearly show that the resonance frequencies $f_0$ set to have an average within a range of from 700 to 1800 Hz provide the reduction of a target air column resonance noise by 2 dB or more.

EXAMPLE 20

The noise level differences between the Example tire having a pitch length of 38.5 mm based on the maximum depth of the air chamber of a resonator which resonates at about 1000 Hz relative to the circumferential groove having the maximum depth of 8 mm as a parameter and the conventional tire were obtained under the same conditions as those in Example 1.

Figure 28:
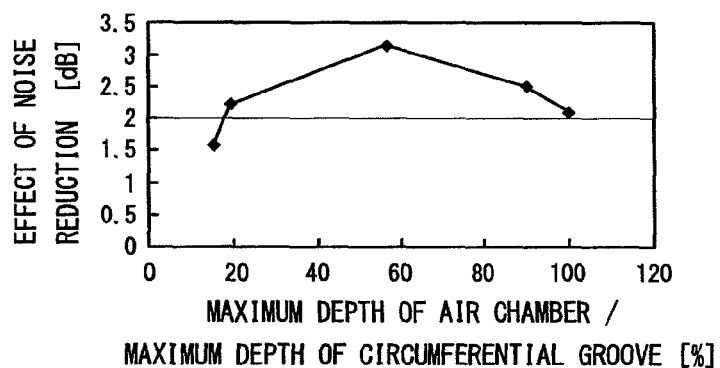
FIG. 28 is a view showing the results of Example 20.

The effect of noise reduction by the Example tire as the result is shown in FIG. 28.

According to FIG. 28, the results show that the larger effect of noise reduction can be obtained with the maximum depth of the air chamber within a range of 20% or more, particularly from 40 to 80%.

EXAMPLE 21

Figure 29:
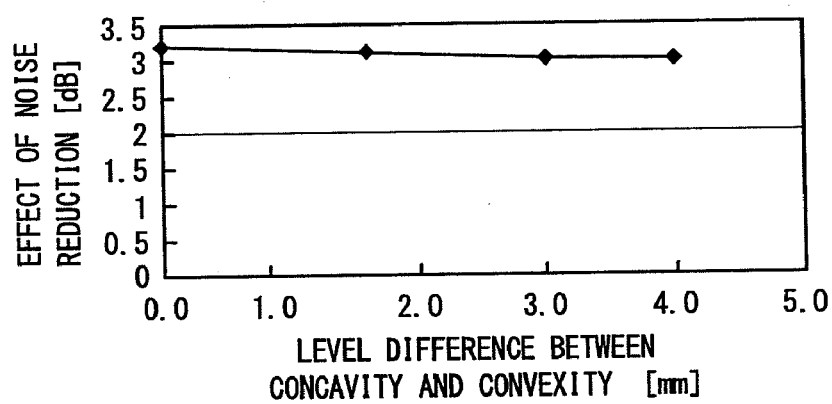
FIG. 29 is a view showing the results of Example 21.

The Example tires having resonators with air chambers in which projections were provided at the bottom walls thereof so that there were level differences between concavity and convexity of 1.6 mm, 3.0 mm, and 4.0 mm individually were used for driving on a gravel road of test course to check the occurrence of stone trapping to the air chambers and the narrowed necks, to find that, as shown in FIG. 29, stone trapping is observed in the air chamber having a bottom wall having no level difference between concavity and convexity, but that no stone trapping occurred in the Example tire with projections.

The resonators with air chambers in which projections were provided at the bottom walls thereof are able to keep the required volumes of the air chambers as clearly seen from the graph of FIG. 29, and also fulfill the function to reduce noise as intended as long as the concavity and convexity does not divide the air chamber.

EXAMPLE 22

A narrowed neck is formed by a sipe, and the radius r of the narrowed neck in the case where the resonance frequency of a resonator is obtained by the following formula is obtained by back calculation of the cross sectional area of the sipe:

$$f_0 = \frac{c}{2\pi} \sqrt{\frac{S}{(l_0 + 1.3r) V}} \qquad \text{[Formula 10]}$$

The resulting effect by the Example tire which had a pitch length of 77 mm and had three types of resonance frequencies $f_0$ of about 900 Hz, about 1000 Hz, and about 1200 Hz relative to the above conventional tire is a noise reduction by 2.5 dB under the measuring conditions described in Example 1.

EXAMPLE 23

Figure 30:
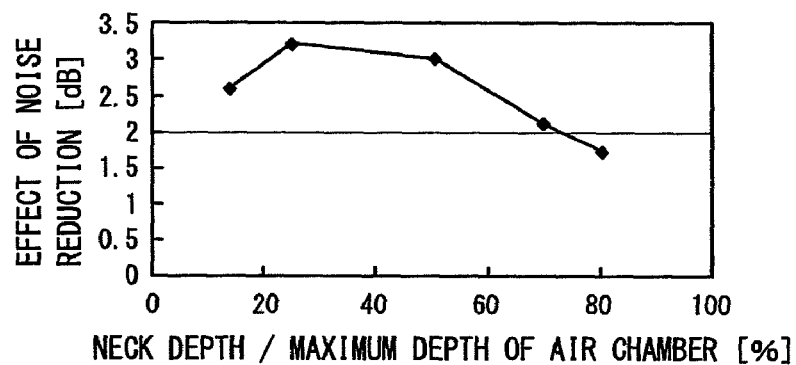
FIG. 30 is a view showing the results of Example 23.

The effect of noise reduction in the Example tire that had a pitch length of 77 mm and is provided with resonators having resonance frequencies the average of which is about 1000 Hz relative to a conventional tire is examined using a ratio of a depth from a tread surface of a narrowed neck that is open at the surface (like a sipe) to the maximum depth of the air chamber as a parameter in the same way as in Example 1, to obtain the results shown in FIG. 30.

According to FIG. 30, the results show that the effect of noise reduction by 2.0 dB or more is obtained at a ratio of 70% or less, and the effect by 3.0 dB or more is obtained at a ratio of 25 to 50%.

For the narrowed neck itself, the shallower the neck is, the more advantageous it is to resist against uneven wearing, but if too shallow, the narrowed neck may be eliminated while the land portion is being worn out as described above.

Also, for the air chamber, the shallower the air chamber is and also the smaller area the opening of the air chamber has toward a land portion surface, the more advantageous it is to resist against uneven wearing and anti-wearing.

EXAMPLE 24

The effect of noise reduction by the Example tire having a pitch length of 38.5 mm and including three types of resonators with air chambers which were open rectangularly as shown in FIG. 7(a) and had an opening width of 6 mm and opening lengths of 8.4 mm, 12 mm, and 15.6 mm, the air chamber having a depth of 6 mm, and the neck having a width of 0.5 mm, a length of 6 mm, and a depth of 2 mm relative to a conventional tire is examined in the same way as in Example 1, which is found to be 2.6 dB.

The effect of noise reduction by the Example tire including resonators with air chambers which had circular opening toward a land portion surface and had a radius of 4.8 mm to obtain the effect of noise reduction similar to the above effect relative to a conventional tire is examined under the conditions, which is found to be 2.7 dB.

According to the above results, it is found that the air chamber which functions as a resonance chamber is able to sufficiently fulfill the function as a resonator even when configured by a combination of a simple two-dimensional shape and a depth which can be easily formed.

EXAMPLE 25

The effects of noise reduction with respect to the partial overall values in a 1/3 octave band with center frequencies of 800 Hz, 1000 Hz, and 1250 Hz relative to the conventional tire by a comparative tire having a tread ground contact area with one circumferential groove which extended centrally in a straight line thereof and had a width of 8 mm and a depth of 8 mm and three types of resonators (having resonance frequencies of 889 Hz, 1014 Hz, and 1212 Hz) open to the groove, the resonators being arranged so that there is a moment when no resonator is included in the ground contact area (with a ground contact length of about 140 mm) while the tire is rolling under load, and by the Example tire in which resonators were arranged so that one resonator is constantly included in the ground contact area, were individually obtained in the same way as in Example 1, to find that the effects were a reduction by 1.5 dB in the comparative tire and a reduction by 2.5 dB in the Example tire.

EXAMPLE 26

The partial overall values in a 1/3 octave band with center frequencies of 800 Hz, 1000 Hz, and 1250 Hz were individually measured as in the case of Example 1 in the Example tire in which resonators were arranged in the manner shown in FIG. 7(b) so that the resonators having air chambers with a square opening and operating at about 800 Hz, about 1000 Hz, and about 1250 Hz as shown in Table 9 were constantly included in the ground contact area and in the conventional tire, to obtain the effect of noise reduction by 3.3 dB in the Example tire.

TABLE 9

| Width of Air Chamber [mm] | Length of Air Chamber [mm] | Depth of Air Chamber [mm] | Length of Neck [mm] | Depth of Neck [mm] | Width of Neck [mm] | Operation Frequency [mm] |
|---|---|---|---|---|---|---|
| 6 | 12 | 4 | 6 | 2 | 0.5 | 1242 |
| 6 | 12 | 6 | 6 | 2 | 0.5 | 1014 |
| 7 | 16 | 6 | 6 | 2 | 0.5 | 813 |

According to the table, the results show that the noise generated in the tire can be significantly reduced by arranging each type of resonators which function simultaneously in a broad frequency band.

Furthermore, in another embodiment of the present invention, particularly, the narrowed neck has the plane maximum width which is within a range of from 3 to 50% of the plane maximum width of the air chamber in a no-load to the tire.

Figure 31:
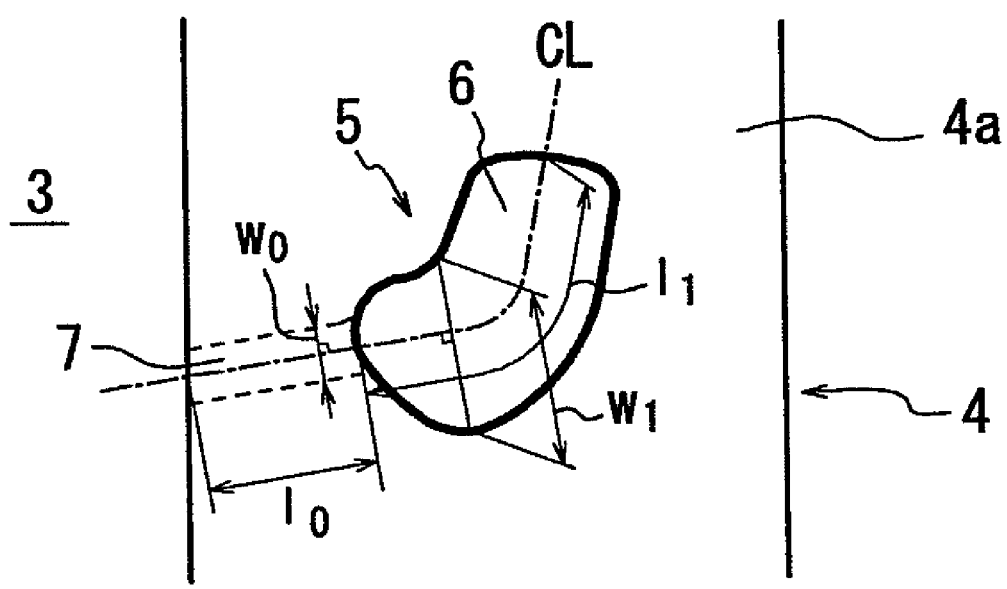
FIG. 31 is an enlarged and developed plan view illustrating a resonator of another embodiment.

That is, in the tire, in the resonator 5 which can be configured as illustrated by the main part perspective view in FIG. 5, as shown by the enlarged and developed plan view in FIG. 31 in context of the resonator of FIG. 5(a), the plane maximum width of the narrowed neck 7 which is measured in the direction perpendicular to the plane central line CL of the resonator 5, that is, the maximum width $w_0$ of the tunnel-shaped narrowed neck 7 among the projection widths toward the land portion surface, is set to be within a range of from 3 to 50%, more preferably 3 to 20% of the plane maximum width $w_1$ of the air chamber 6 which is measured in the direction perpendicular to the plane central line CL.

In the present embodiment, more specifically, preferably, the plane maximum width $w_0$ of the narrowed neck 7 is within a range of from 0.5 to 4.0 mm, particularly 0.5 to 2.0 mm, and the plane maximum width $w_1$ of the air chamber 6 is within a range of from 3.0 to 15.0 mm, particularly 5.0 to 10.0 mm.

Moreover, preferably, the plane length of the narrowed neck 7 measured on the above described plane central line CL is within a range of from 2 to 50 mm, particularly 2 to 30 mm, and the plane length $l_1$ of the air chamber measured on the plane central line CL is within a range of from 5 to 50 mm, particularly 5 to 30 mm.

In the above description, the air chamber 6 preferably have, as described above for FIG. 6, a bottom surface having one or more upward projection 6a as convexity, so that the surface has the concavity and convexity difference δ of 1.6 mm or more, more preferably 3.0 mm or more.

The resonator 5 configured as described above are arranged to the circumferential groove 3 in a manner, for example as shown in FIG. 1, so that, when one circumferential groove 3 is formed in the tread 1 and when a plurality of circumferential groove are formed in the tread 1, a plurality of the resonator 5 which are provided to at least one circumferential groove 3 and have different resonance frequencies are constantly and completely included in the ground contact area 2 under the conditions explained for FIG. 1, and more preferably, in a manner so that a plurality of the resonators 5a, 5b, and 5c having different resonance frequencies are included simultaneously at any moment in the ground contact area 2 which contacts ground under the same conditions as described above, as illustrated in FIG. 4.

FIG. 4 shows that a plurality of resonators are included in the ground contact area 2 for each of the circumferential grooves 3 extending in the ground contact area 2, but the resonators may be arranged in a manner so that only the plurality of resonators provided to at least one circumferential groove 3 among a plurality of circumferential groove 3 are included in the ground contact area 2.

EXAMPLE 27

A tire (size: 195/65R15) mounted to a 6JJ rim and inflated with an air pressure of 210 kPa is rotated at a speed of 80 km/h with a load of 4.47 kN applied thereto using an indoor drum tester, and the sound on both sides of the tire is measured according to the condition specified in JASO C606 to obtain partial overall values in a 1/3 octave band with center frequencies of 800 Hz, 1000 Hz, and 1250 Hz.

In the case, the result of a reduction of sound pressure by 2 dB or more is determined to be effective because the amount of reduction can be expected to improve the feeling evaluation by a driver in a real car test.

The resonator had a resonance frequency $f_0$ which can be obtained by the following formula as described above:

$$f_0 = \frac{c}{2\pi} \sqrt{\frac{S}{(l_0 + 1.3r) V}} \quad \text{[Formula 11]}$$

In the present example, the sound velocity c is 343.7 m/s.

The measured result with a conventional tire having a ground contact area with four straight circumferential grooves which extended therein and had a width of 8 mm and a depth of 8 mm, and the measured result with the Example tire having sixty resonators arranged in the manner shown in FIG. 7(b) to each of four straight circumferential grooves which extended in a ground contact area and had a width of 8 mm and a depth of 8 mm, the resonators individually having a form as shown in FIG. 7(a) with air chambers which had a rectangular opening at a land portion surface, and the resonators having the plane maximum width of the air chamber of 6.0 mm, the air chamber plane lengths of 8.4 mm, 12 mm, and 15.6 mm, and the air chamber depth of 6.0 mm, and also having the plane maximum width of the narrowed neck of 0.5 mm, the plane length of 6 mm, and the neck depth of 2.0 mm, so that the air chambers had the volumes V of 302 mm$^3$, 432 mm$^3$, and 562 mm$^3$, the sectional area of neck S of 1 mm$^2$, the radius of neck r of 0.56 mm, so that the resonators had resonance frequencies of 889 Hz, 1014 Hz, and 1212 Hz, were compared, to find the reductions of the above partial overall values with center frequencies of 800 Hz, 1000 Hz, and 1250 Hz by 2.6 dB in the Example tire.

EXAMPLE 28

The difference of the partial overall values in a 1/3 octave band with center frequencies of 800 Hz, 1000 Hz, and 1250 Hz between the Example tire having a pitch length of 38.5 mm and using the ratio of the plane maximum width of the neck to the plane maximum width of the air chamber of the three types of resonators as shown in FIG. 7(a) which resonate at the frequencies the average of which is about 1000 Hz as a parameter and the above conventional tire were obtained under the same conditions as those in Example 27.

Figure 32:
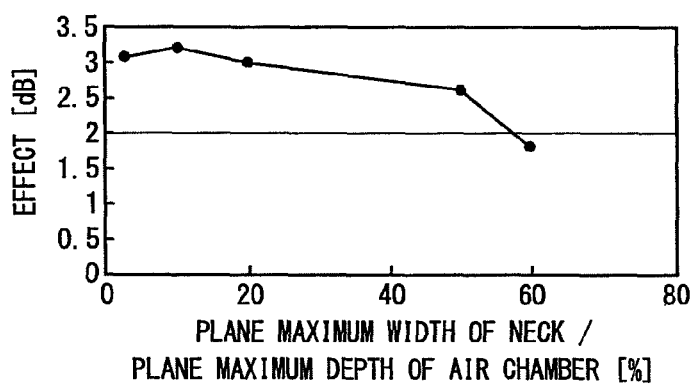
FIG. 32 is a view showing the results of Example 28.

The effect of noise reduction in the Example tire is shown in FIG. 32.

According to FIG. 32, the results show that, with the ratio of the plane maximum width within a range of from 3 to 50%, the noise can be reduced by 2.5 dB or more, and that particularly the effect is obvious with the ratio within a range of 3 to 20% by the reduction of 3 dB or more.

EXAMPLE 29

The differences of noise levels between the Example tire in which the resonator were arranged in the manner shown in FIG. 7(b) and the average of resonance frequencies $f_0$ is varied and the conventional tire were measured in the same manner as in Example 27.

Figure 33:
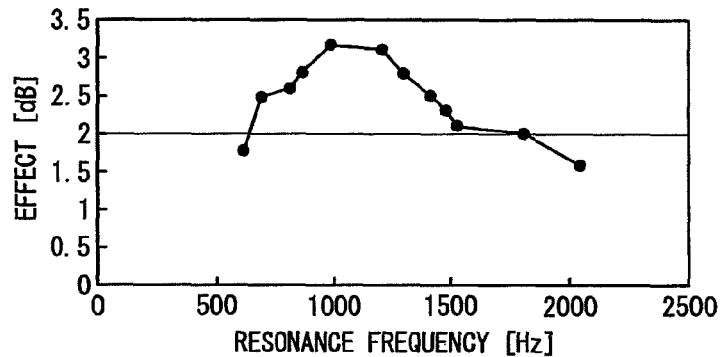
FIG. 33 is a view showing the results of Example 29.

The effect of noise reduction in the Example tire is shown in FIG. 33.

According to FIG. 33, the results clearly show that the resonance frequencies $f_0$ within a range of from 700 to 1800 Hz provide the reduction of a target air column resonance noise by 2 dB or more, and that particularly the resonance frequencies $f_0$ within a range of from 700 to 1400 Hz can provide an excellent effect.

EXAMPLE 30

The noise levels in both of the Example tire using the plane maximum width of the narrowed neck of the resonator which resonated at about 1000 Hz as a parameter and the Example tire using the plane maximum width of the air chamber as a parameter, and the noise level in the conventional tire were measured in the same way as in Example 27.

Figure 34:
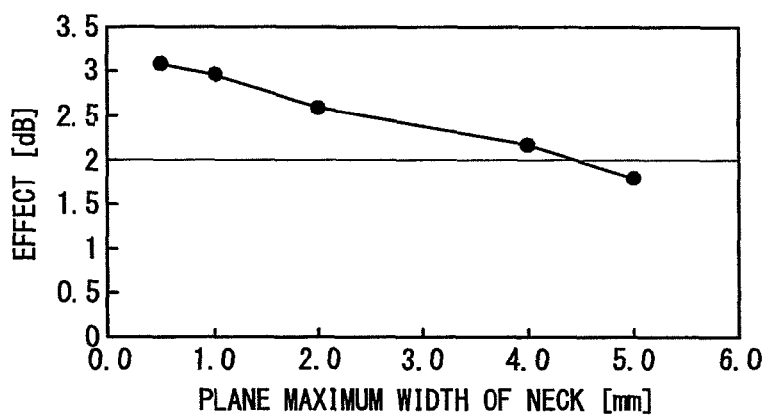
FIG. 34 is a view showing the results of Example 30.
Figure 35:
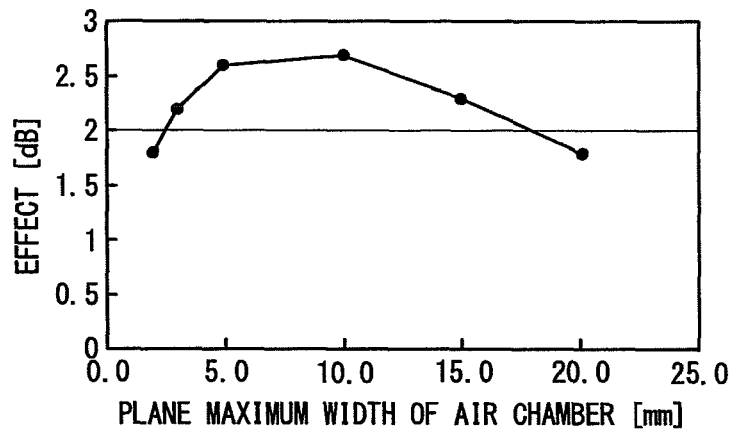
FIG. 35 is a view showing the results of Example 30.

The effects of noise reduction in the Example tires as the results are individually shown in FIGS. 34 and 35.

According to FIG. 34, the results show that the plane maximum width of the narrowed neck within a range of from 0.5 to 4.0 mm provides the effect of noise reduction over 2 dB, and that particularly, the effect is obvious by the reduction by 2.5 dB or more with the plane maximum width within a range of from 0.5 to 2.0 mm.

Also, according to FIG. 35, the results show that the effect of noise reduction over 2 dB can be obtained with the plane maximum width of the air chamber within a range of from 3.0 to 15.0 mm.

EXAMPLE 31

The partial overall values explained in Example 27 of the Example tire using the plane length of the narrowed neck of the three types of resonators which resonated at about 900 Hz, about 1000 Hz, and about 1200 Hz as a parameter and the conventional tire, and the partial overall values of the Example tire using the plane length of the air chamber as a parameter were individually measured under the same conditions as those in Example 27.

Figure 36:
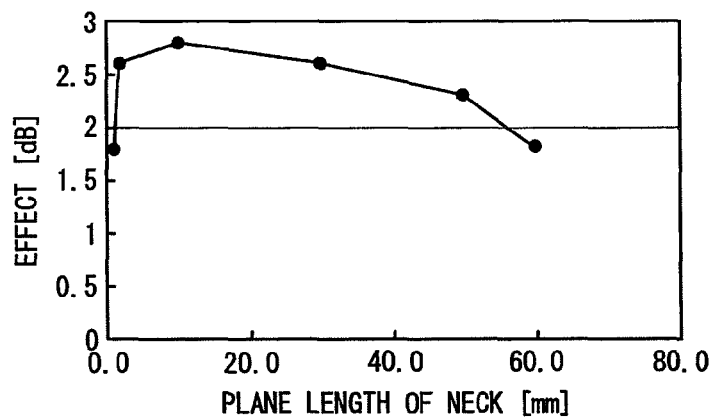
FIG. 36 is a view showing the result in Example 31.
Figure 37:
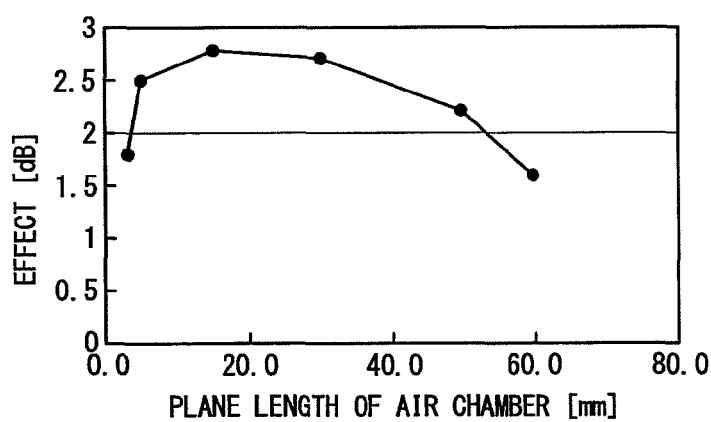
FIG. 37 is a view showing the result in Example 31.

The effects of noise reduction in the Example tires are individually shown in FIGS. 36 and 37.

According to FIG. 36, the results show that the plane length of the narrowed neck within a range of from 2 to 50 mm provides the reduction of noise reduction by 2 dB or more, and that particularly, the effect is especially large with the plane length within a range of from 2 to 30 mm, while according to FIG. 37, the results show that the plane length of the air chamber within a range of from 5 to 50 mm provides the reduction of noise reduction by 2 dB or more, and that particularly, the effect of reduction by 2.5 dB or more can be achieved with the plane length within a range of from 5 to 30 mm.

EXAMPLE 32

The Example tires having resonators which resonated at 889 Hz, 1014 Hz, and 1212 Hz and included air chambers which were provided with projections at the bottom walls thereof so that there were level differences between concavity and convexity of 1.6 mm, 3.0 mm, and 4.0 mm individually, with the air chamber width of 6.0 mm, the air chamber lengths of 8.4 mm, 12 mm, and 15.6 mm, the air chamber depth of 6.0 mm, the neck length of 6 mm, the neck depth of 2.0 mm, and the neck width of 0.5 mm, were used for driving on a gravel road of test course for 5 km to check the occurrence of stone trapping to the air chambers and the narrowed necks, to obtain the results shown in Table 10.

TABLE 10

| Concavity and Convexity Difference (mm) | Presence/Absence of Stone Trapping | Effect [dB] |
| --- | --- | --- |
| 0.0 | Presence | 2.6 |
| 1.6 | Absence | 2.7 |
| 3.0 | Absence | 2.8 |
| 4.0 | Absence | 2.8 |

According to Table 10, the results show that stone trapping is observed in the air chamber having no level difference between concavity and convexity at the bottom wall, but that no stone trapping occurred in the air chamber which is provided with projections.

Also, Table 10 tells that the resonators with air chambers in which projections were provided at the bottom walls thereof is able to keep the required volumes of the air chambers, and also fulfill the function to reduce noise as intended as long as the concavity and convexity does not divide the air chamber.

EXAMPLE 33

A narrowed neck is formed by a sipe, and a radius r of the narrowed neck in the case where the resonance frequency of a resonator is obtained by the following formula is obtained by back calculation of the cross sectional area of the sipe:

$$f_0 = \frac{c}{2\pi} \sqrt{\frac{S}{(l_0 + 1.3r) V}} \quad \text{[Formula 12]}$$

The resulting effect of the Example tire with the average of the resonance frequencies $f_0$ being about 1000 Hz relative to the conventional tire is a noise reduction by 2.5 dB under the measuring conditions described in Example 1.

EXAMPLE 34

Figure 38:
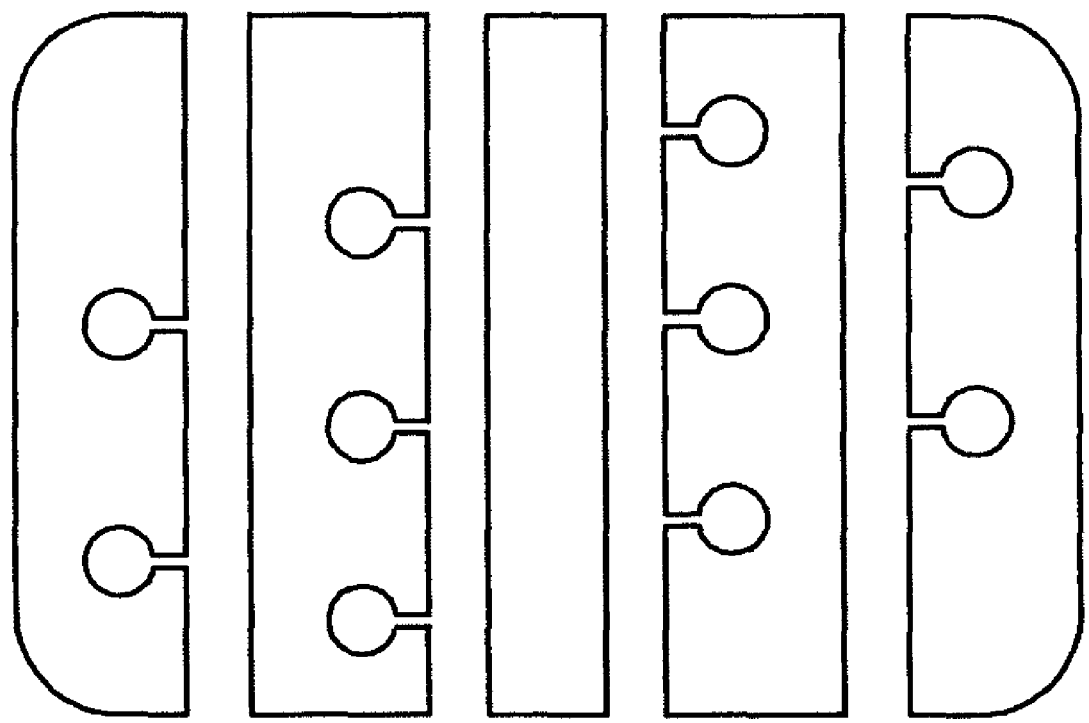
FIG. 38 is a view showing the resonator arrangement manner of Example 34.

The effect of noise reduction by the Example tire in which resonators including the air chamber with a circular opening toward a land portion surface having a radius of 4.8 mm were arranged in the manner as shown in FIG. 38, in order to obtain the effect of noise reduction as in the case where the resonator had the air chamber with a square opening at a land portion surface as described in Example 27, relative to the conventional tire is similarly obtained, which is found to be 2.7 dB.

The three types of resonators (the resonance frequencies of 889 Hz, 1014 Hz, and 1212 Hz) individually had the air chamber depth of 7.8 mm, 6.0 mm, and 4.2 mm.

According to the above results, it is found that the air chamber which functions as a resonance chamber is able to sufficiently fulfill the function as a resonator even when configured by a combination of a simple two-dimensional shape and a depth which can be easily formed.

EXAMPLE 35

The effects of noise reduction with respect to the partial overall values in a 1/3 octave band with center frequencies of 800 Hz, 1000 Hz, and 1250 Hz relative to the conventional tire by a comparative tire having a tread ground contact area with one circumferential groove which extended centrally thereof and had a width 8 mm and a depth 8 mm and a plurality of resonators (having resonance frequencies of 889 Hz, 1014 Hz, and 1212 Hz) open to the groove, the resonators being arranged so that there is a moment when no resonator is included in the ground contact area (with a ground contact length of about 140 mm) while the tire is rolling under load (the resonators being arranged by a pitch length of 38.5 mm on a half circumference of the tire), and by the Example tire in which resonators were arranged so that one resonator is included in the ground contact area at any moment (the resonators being arranged by a pitch length of 38.5 mm×2 (mm) on the entire circumference of the tire) were individually obtained in the same way as in Example 1, to find that the effects were a reduction by 1.5 dB in the comparative tire and a reduction by 2.5 dB in the Example tire.

The resonators included in both of the tires of the present example were the same as those described in Example 27.

EXAMPLE 36

The partial overall values in a 1/3 octave band with center frequencies of 800 Hz, 1000 Hz, and 1250 Hz were individually measured as in the case of Example 26 using the Example tire in which resonators were arranged in the manner shown in FIG. 7(b) so that the resonators operating at about 800 Hz, about 1000 Hz, and about 1250 Hz and being configured as shown in Table 11 were included in the ground contact area at any moment, and the conventional tire, to obtain the effect of noise reduction by 3.3 dB in the Example tire.

TABLE 11

| Width of Air Chamber [mm] | Length of Air Chamber [mm] | Depth of Air Chamber [mm] | Length of Neck [mm] | Depth of Neck [mm] | Width of Neck [mm] | Operation Frequency [Hz] |
| --- | --- | --- | --- | --- | --- | --- |
| 6 | 12 | 4 | 6 | 2 | 0.5 | 1242 |
| 6 | 12 | 6 | 6 | 2 | 0.5 | 1014 |
| 7 | 16 | 6 | 6 | 2 | 0.5 | 813 |

According to the table, the results show that the noise generated in the tire can be significantly reduced by arranging each type of the resonators which function simultaneously in a broad frequency band.

The invention claimed is:
1. A pneumatic tire, comprising:
a circumferential groove which circumferentially and continuously extends and arranged on a tread surface; and resonators which are open to the circumferential groove and terminate in a land portion, each of the resonators being configured with an air chamber which is open toward a surface of the land portion and a narrowed neck for a communication between the air chamber and the circumferential groove, and the resonator being arranged so that a plurality of resonators having different resonance frequencies are completely included in a ground contact area at any moment, when the tire mounted to an applicable rim is inflated with a defined air pressure and is postured to be applied by a load corresponding to 80% of a defined mass, wherein the narrowed neck has an extending angle within a range of from 10° to 60° relative to the width direction of the tread.

2. The pneumatic tire according to claim 1, wherein the plurality of resonators constantly included in the ground contact area have resonance frequencies, with the difference between the maximum value and the minimum value of the frequencies being within a range of from 200 to 800 Hz.

3. The pneumatic tire according to claim 1, wherein the number of the resonators which are arranged to be constantly included in the ground contact area is three or more for each circumferential groove.

4. The pneumatic tire according to claim 1, wherein the air chamber of the resonator has dimensions which are determined depending on a length of pitch accompanied by the application of pitch variation.

5. The pneumatic tire according to claim 1, wherein the resonators having resonance frequencies the average of which is within a range of from 700 to 1800 Hz are arranged in at least one pitch on the circumference of the tread having a tread pattern with a pitch variation.

6. The pneumatic tire according to claim 1, wherein one or more resonators having a resonance frequency within a range of from 609 to 2153 Hz are arranged in at least one circumferential pitch.

7. The pneumatic tire according to claim 1, wherein the air chamber has a bottom wall which is provided with a convex-concave structure having a height of 1.6 mm or more.

8. The pneumatic tire according to claim 1, wherein the narrowed neck has a depth which is equal to or less than the depth of the air chamber.

9. The pneumatic tire according to claim 1, wherein the air chamber has an opening toward a land portion surface, the opening having a contour of an aspect ratio within a range of from 2 to 20.

10. The pneumatic tire according to claim 1, wherein the opening of the air chamber toward a land portion surface has an area which gradually decreases outwardly from the tread center in the width direction of the tread.

11. The pneumatic tire according to claim 1, wherein the opening of the air chamber toward a land portion surface has an area which is larger than the area of the bottom wall of the air chamber.

12. The pneumatic tire according to claim 1, wherein the narrowed neck has a width which gradually narrows toward the bottom of the neck.

13. The pneumatic tire according to claim 1, wherein the resonator is configured with one air chamber which is open at a land portion surface, and two or more narrowed necks which are separately open at a wall of a common circumferential groove for communication between the air chamber and the circumferential groove.

14. The pneumatic tire according to claim 13, wherein the two or more narrowed necks are completely separated from each other.

15. The pneumatic tire according to claim 1, wherein the opening of the air chamber toward a land portion surface has an area within a range of from 25 to 300 mm$^2$.

16. The pneumatic tire according to claim 1, wherein the narrowed neck has the plane maximum width which is within a range of from 3 to 50% of the plane maximum width of the air chamber.

* * * * *